(12) United States Patent
Kamakura

(10) Patent No.: US 10,025,104 B2
(45) Date of Patent: Jul. 17, 2018

(54) HEAD-MOUNT TYPE IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/418,915

(22) Filed: Jan. 30, 2017

(65) Prior Publication Data

US 2017/0235147 A1    Aug. 17, 2017

(30) Foreign Application Priority Data

Feb. 15, 2016  (JP) ................. 2016-026430

(51) Int. Cl.
| | |
|---|---|
| *G02B 27/14* | (2006.01) |
| *G02B 27/01* | (2006.01) |
| *G02B 7/02* | (2006.01) |
| *G02C 5/12* | (2006.01) |
| *G02C 5/16* | (2006.01) |
| *G02C 7/16* | (2006.01) |
| *G02C 11/00* | (2006.01) |

(52) U.S. Cl.
CPC ......... *G02B 27/0176* (2013.01); *G02B 7/02* (2013.01); *G02B 27/017* (2013.01); *G02C 5/126* (2013.01); *G02C 5/16* (2013.01); *G02C 7/16* (2013.01); *G02C 11/10* (2013.01); *G02B 2027/0169* (2013.01); *G02B 2027/0178* (2013.01); *G02C 2200/08* (2013.01)

(58) Field of Classification Search
CPC ........ G02B 27/0172; G02B 2027/0178; G02B 27/0176; G02B 2027/0118; G02B 27/0101
USPC .................................. 359/630–639
See application file for complete search history.

(56) References Cited

U.S. PATENT DOCUMENTS

| | | | | |
|---|---|---|---|---|
| 5,539,422 | A * | 7/1996 | Heacock | G02B 27/0172 345/8 |
| 5,774,096 | A * | 6/1998 | Usuki | G02B 7/12 340/980 |
| 8,237,626 | B2 * | 8/2012 | Ishino | G02B 27/017 345/8 |
| 2006/0070168 | A1 * | 4/2006 | Nakabayashi | G02B 27/0176 2/171 |
| 2014/0232619 | A1 | 8/2014 | Hiraide | |

FOREIGN PATENT DOCUMENTS

JP        2014-160112 A      9/2014

* cited by examiner

*Primary Examiner* — Mohammed Hasan
(74) *Attorney, Agent, or Firm* — Oliff PLC

(57) ABSTRACT

A head-mount type image display device includes a display section adapted to display an image, a frame member adapted to support the display section, and a case member attached to the frame member, the frame member includes a support part adapted to support the display section, and a side surface part extending from an end of the support part in a direction crossing the support part, the case member is combined with the side surface part to form a housing space adapted to house a housed member making a contribution to display of the image by the display section, and the side surface part includes a first rib extending along a first direction, and a second rib extending along a second direction crossing the first direction.

9 Claims, 13 Drawing Sheets

HEAD-MOUNT TYPE IMAGE DISPLAY DEVICE

BACKGROUND

1. Technical Field

The present invention relates to a head-mount type image display device.

2. Related Art

In the past, there has been known a head-mount type image display device, a so-called head mounted display (HMD), which is mounted on the head of a user to display an image so as to be visually recognized by the user. As such a head mounted display, there has been known a virtual image display device provided with a first display device for making the right eye of the user visually recognize an image (virtual image) for the right eye, a second display device for making the left eye of the user visually recognize an image (virtual image) for the left eye, and a frame part for supporting the first display device and the second display device (see, e.g., JP-A-2014-160112 (Document 1)).

In the virtual display device described in Document 1, the frame part is provided with a frame and a protector. Among these constituents, the frame is a U-shaped member having a front part extending in a lateral direction from right to left, and a pair of side surface parts extending in a depth direction from front to back, and is formed of a metal material such as die-cast aluminum.

To a side end part, which is a part straddling a left end part of the front part and the side surface part on the left side in such a frame, there are screwed a first optical member and a first image forming main body part constituting the first display device, and to a side end part, which is a part straddling a right end part of the front part and the side surface part on the right side, there are screwed a second optical member and a second image forming main body part constituting the second display device. Further, to the side end part on the left side, there is attached an exterior member for covering the first image forming main body part, and to the side end part on the right side, there is attached an exterior member covering the second image forming main body part.

It should be noted that the first image forming main body part has an image display device for forming the image light and a projection lens disposed in the lens tube and for projecting the image light, and the first optical member has a light guide part having a prism shape for guiding the image light thus projected to the eyes of an observer while reflecting the image light inside.

Incidentally, the head mounted display is mounted on the head of the user, and is therefore requested to be light in weight in order to reduce the burden of the user.

To deal with the request, it is possible to achieve the reduction in weight of a virtual image display device by thinly forming the side end parts described above in the virtual image display device described in Document 1 mentioned above. However, in this case, since the strength of the side end parts decreases, if an impact is applied from the outside, there is a possibility that the side end parts are distorted.

Therefore, there has been demanded a configuration capable of increasing the strength of the side parts of the head mounted display.

SUMMARY

An advantage of some aspects of the invention is to provide a head-mount type image display device capable of increasing the strength of the side parts.

A head-mount type image display device according to an aspect of the invention includes a display section adapted to display an image, a frame member adapted to support the display section, and a case member attached to the frame member, the frame member includes a support part adapted to support the display section, and a side surface part extending from an end of the support part in a direction crossing the support part, the case member is combined with the side surface part to form a housing space adapted to house a housed member making a contribution to display of the image by the display section, and the side surface part includes a first rib extending along a first direction, and a second rib extending along a second direction crossing the first direction.

In the case in which such a head-mount type image display device is mounted to the user, for example, the support part is located in front of the user, and at least a part of the side surface part is opposed to the temple of the user.

According to the aspect of the invention, the side surface part of the frame member has the first rib and the second rib respectively extending along the first direction and the second direction crossing each other. According to this configuration, even in the case in which an impact is applied to the side surface part, it is possible to resist the strain of the side surface part due to the impact with at least one of the first rib and the second rib. Therefore, the strength of the side surface part can be increased. Further, since the side surface part to be combined with the case member described above can be formed to have a small thickness accordingly, reduction in weight of the head-mount type image display device can be achieved. Besides the above, since the region (hereinafter referred to as a housing part) in which the members described above are housed can be formed to have a small thickness, the wearing feeling of the head-mount type image display device can be improved.

In the aspect of the invention described above, it is preferable that the first rib and the second rib cross each other.

According to such a configuration, the strength of the side surface part to the impact described above can further be increased compared to the case in which the first rib and the second rib are separated from each other.

In the aspect of the invention described above, it is preferable that the housed member includes an image projection section housed in the housing space, and adapted to project the image to the display section, and the case member includes a first case adapted to be engaged with at least one of the first rib and the second rib to cover the image projection section from an upper side, and a second case adapted to cover the image projection section from a lower side.

According to such a configuration, since the image projection section is covered with the first case and the second case from the upper and lower sides, the image projection section can surely be protected. Further, since the first case engages with at least either of the first rib and the second rib, it is possible to dispose the first case along the side surface part. Therefore, the connection of the first case to the side surface part can easily be achieved, and in addition, the housing part can be reduced in thickness compared to the case in which the first case and the side surface part are disposed separately from each other.

In the aspect of the invention described above, it is preferable that the image projection section has a lens tube adapted to house a lens adapted to project the image, the frame member has a first fixation part, which is disposed on an upper side of the lens tube, and to which the lens tube is fixed, the second case is located on a lower side of the lens tube, and the second case has a second fixation part to be fixed to the lens tube.

According to such a configuration, the lens tube is fixed to the frame member with the first fixation part, and the second case is fixed to the lens tube with the second fixation part. According to this configuration, the second case can be fixed to the frame member via the lens tube. Therefore, the second case can stably be fixed to the frame member.

In the aspect of the invention described above, it is preferable that the case member includes a third case adapted to cover the second case from an outer side, and connected to the first case and the side surface part.

According to such a configuration, the lens tube can be housed in the housing space surrounded by the side surface part, the first case, and the third case. Further, since the side surface part, the first case, and the third case are connected to each other, it is possible to prevent the dust or the like from entering the housing space. Therefore, it is possible to prevent the image from deteriorating due to the dust attached to the lens housed in the lens tube, and in addition, the lens tube can surely be protected.

In the aspect of the invention described above, it is preferable that the frame member has a case fixation part to which the first case, the second case, and the third case are fixed.

According to such a configuration, since the first case, the second case, and the third case can be fixed to the frame member, these cases can stably be disposed.

In the aspect of the invention described above, it is preferable that the case fixation part is located in at least either of the first rib and the second rib.

According to such a configuration, there is no need to separately provide the case fixation part to the frame member. Therefore, it is possible to simplify the internal configuration of the housing part, and in addition, the housing part can be miniaturized.

In the aspect of the invention described above, it is preferable that the first direction is along an extending direction of the side surface part from the support part, and the first case has a contact part having contact with the first rib extending along the first direction.

According to such a configuration, by making the contacting part of the first case and the first rib have contact with each other, the first case can surely and easily be disposed along the side surface part. Therefore, it is possible to simplify the configuration of the first case and, by extension, assembly of the head-mount type image display device.

In the aspect of the invention described above, it is preferable that the frame member is a metallic member having the support part and the side surface part integrated with each other.

According to such a configuration, since the frame member as the metallic member has the higher strength compared to the case in which the frame member is formed of resin or the like, the side surface part the first rib and the second rib can be formed to have a smaller thickness. Therefore, since the housing part and, by extension, the head-mount type image display device can be reduced in weight, and in addition, the housing part can be configured to have a small thickness, the wearing feeling of the head-mount image display device can further be improved. Further, since the support part and the side surface part are integrated with each other, no joints between these parts are exposed, and therefore, the appearance of the head-mount type image display device can be made better.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
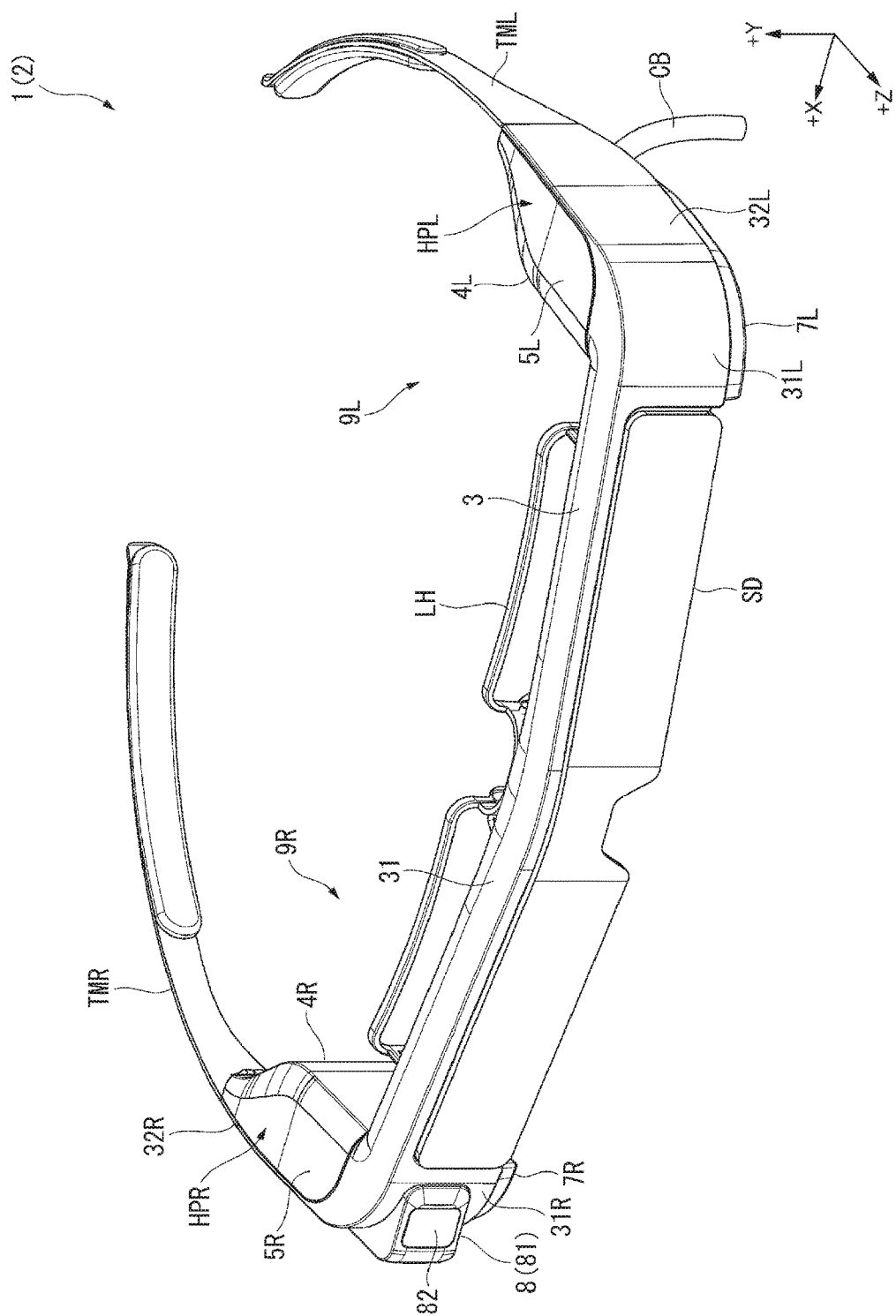
FIG. 1 is a perspective view showing an HMD according to an embodiment of the invention.
Figure 2:
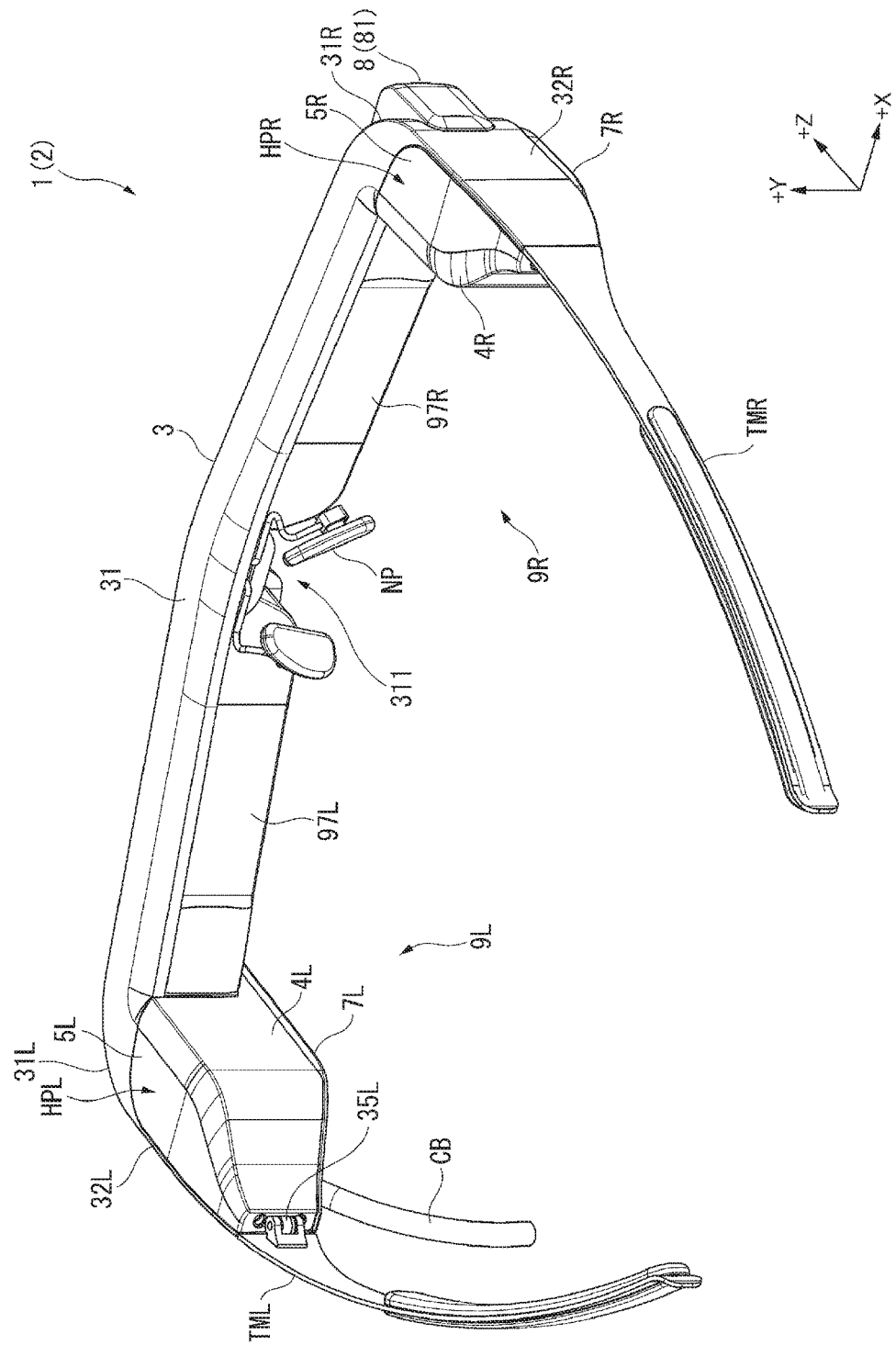
FIG. 2 is a perspective view showing the HMD according to the embodiment.

An embodiment of the invention will hereinafter be described with reference to the accompanying drawings.
Exterior Configuration of HMD FIG. 1 and FIG. 2 are each a diagram showing an appearance of an HMD 1 according to the present embodiment. In the detailed description, FIG. 1 is a perspective view of the HMD 1 viewed from the front, and FIG. 2 is a perspective view of the HMD 1 viewed from the back.

The HMD (head mounted display) 1 according to the present embodiment is a see-through type head-mount type image display device, which is used while being mounted on the head of the user, displays an image so as to visually be recognized by the user, and at the same time transmits the outside light to make it possible to observe the external world. As shown in FIG. 1 and FIG. 2, the HMD 1 is provided with a frame 2, and an imaging device 8 (FIG. 1) and two optical devices 9R, 9L each supported by the frame 2. Besides the above, the HMD 1 is configured so that a nose pad NP (FIG. 2), a lens holder LH (FIG. 1), and a shield member SD (FIG. 1) are detachably attached to the frame 2.

Further, although the details will be described later, one of the features of the HMD 1 according to the present embodiment is the point that there are provided ribs 321 through 325 extending along the directions crossing each other to an inner surface 32A on the user side in the side surface parts 32R, 32L of the frame main body 3 constituting the frame 2 to thereby increase the strength of the side surface parts 32R, 32L.

It should be noted that in the following description, the side observed by the HMD 1 in the case of viewing the user wearing the HMD 1 from the front is defined as a front side (or front), and the opposite side is defined as a back side (or back). Further, the upper side and the lower side in the HMD 1 correspond to the upper side and the lower side in the user, and the right side and the left side in the HMD 1 correspond to the right side and the left side in the user wearing the HMD 1.

Further, in the drawings and the descriptions provided hereinafter, among the +X direction, the +Y direction, and the +Z direction perpendicular to each other, the +Z direction is defined as a direction from the back side toward the front side, the +Y direction is described as a direction from the lower side toward the upper side, and the +X direction is defined as a direction from the left side toward the right side. Further, for the sake of convenience of explanation, an opposite direction to the +Z direction is defined as −Z direction. The same applies to −Y direction and −X direction.

Configuration of Nose Pad

As shown in FIG. 2, the nose pad NP is disposed on a mount part 311 located between the light guide members 97R, 97L described later in the frame main body 3 so as to be able to be inserted and pulled out from the pack side. The nose pad NP pinches the nose (the region corresponding to the nostrils) of the user when mounting the HMD 1, and thus, prevents the HMD 1 from being displaced to the right or the left, or displaced downward.

Configuration of Lens Holder

As shown in FIG. 1, the lens holder LH has a configuration like a pair of glasses without temples. The lens holder LH holds the right and left lenses (not shown) for visual corrections, and is disposed on the mount part 311 described above so as to be able to insert and pulled out from the back side.

Configuration of Shield Member

As shown in FIG. 1, the shield member SD is detachably attached to the mount part 311 so as to cover the light guide members 97R, 97L on the front side, which is the opposite side to the nose pad NP and the lens holder LH across the light guide members 97R, 97L. The shield member SD shields at least apart of the outside light entering the light guide members 97R, 97L to make it difficult to see the external world, and thus, improve the visibility of the image displayed.

Schematic Configuration of Frame

As shown in FIG. 1 and FIG. 2, the frame 2 has a configuration similar to a frame of a pair of glasses, and supports the imaging device 8 and the optical devices 9R, 9L as described above. In addition, the nose pad NP, the lens holder LH, and the shield member SD described above are mounted on the frame 2. The frame 2 includes the frame main body 3 having a roughly U-shape viewed from above, case members 4R, 4L attached to the frame main body 3, and temples TMR, TML each provided to the frame main body 3.

Among these constituents, the right side temple TMR and the left side temple TML are regions, which are suspended on the ears of the user to support the HMD 1. These temples TMR, TML are connected to support parts 35R, 35L provided to the frame main body 3 so as to be able to be folded toward the user. By unfolding the temples TMR, TML so as to be roughly parallel to the corresponding side surface parts 32R, 32L, it is possible to suspend the temples TMR, TML on the right and left ears of the user, and thus, the HMD 1 can be mounted on the head. In contrast, in the case in which the user does not wear the HMD 1, by bending the temples TMR, TML inward, it is possible to fold the temples TMR, TML.

It should be noted that the temples TMR, TML are each formed of a plate in which an elastic member made of rubber or the like is fitted, the elastic material being exposed to each of the surface on the user side and the surface on the opposite side to the user side, and having an H-shaped cross-sectional surface. Such a plate can be formed of synthetic resin or metal such as titanium. It should be noted that the elastic member is not limited to such a configuration, but can also be bonded to or fitted to each of the surface on the user side and the surface on the opposite side to the user side in the plate, or can also be provided to only either of these surfaces.

The frame main body 3 corresponds to a frame member according to the invention. The frame main body 3 has a front part 31 disposed along the forehead of the user, and side surface parts 32R, 32L, which respectively extend from both ends in the lateral direction of the front part 31 in a direction crossing the front part 31 toward the back side (the rear of the user), and are respectively disposed along the right and left temples of the user. The frame main body 3 is an integrally molded part made of metal having the front part 31 and the side surface parts 32R, 32L formed integrally.

The front part 31 corresponds to a support part according to the invention, and is a region extending along the lateral direction in the frame main body 3. The front part 31 supports the light guide members 97R, 97L as display parts disposed in front of the right and left eyes of the user. In addition, the front part 31 supports the nose pad NP, the lens holder LH, and the shield member SD with the mount part 311 described above located between the light guide members 97R, 97L thus supported. Further, a left side end part 31L and a right side end part 31R in the front part 31 are each curved backward to form a circular arc viewed from above, and the right side end part 31R is provided with the imaging device 8 described later. Further, the side surface part 32R extends backward from the right side end part 31R, and the side surface part 32L extends backward from the left side end part 31L.

The side surface part 32R is combined with the case member 4R to constitute a housing section HPR having a housing space S (FIG. 3 and FIG. 4) for housing an image projection section 91 and a control section 96 on the right side constituting the optical device 9R inside.

Similarly, the side surface part 32L is combined with the case member 4L to constitute a housing section HPL having a housing space S for housing the image projection section 91 and the control section 96 on the left side constituting the optical device 9L inside.

The side surface parts 32R, 32L and the case members 4R, 4L will be described later in detail.

Configuration of Imaging Device

As shown in FIG. 1 and FIG. 2, the imaging device 8 is provided to the frame main body 3. Specifically, the imaging device 8 is provided to the right side end part 31R in the front part 31. The imaging device 8 has an imaging section and a light emitting section fitted in the right side end part 31R, and a cover 81 attached to an outer surface of the frame main body 3 so as to cover the imaging section and the light emitting section.

Among these constituents, the cover 81 is formed of resin having a light transmissive property, and can visually be recognized as a shape as if the cover 81 having a cubic shape is embedded in the right side end part 31R described above.

The imaging section is disposed so that the imaging direction points to the front side, and takes an image of a front area of the user via a light transmissive member 82 attached to the cover 81.

The light emitting section is arranged so that the emission direction of the light points to the right. The light emitting section is for making an announcement of the operation state of the imaging device 8, and is lit while imaging by the imaging section continues. When lighting the light emitting section described above, the light emitted from the light emitting section is checked from the outside via the cover 81.

Such an imaging device 8 is controlled by the control section 96 disposed in the housing section HPR, and outputs the taken image to the control section 96, and is controlled in the lighting state of the light emitting section by the control section 96 at the same time.

Here, if the light transmissive member 82 functioning as a protective cover has a circular shape, the appearance of the imaging device 8 becomes an appearance of a typical camera, and there is a possibility of causing an uneasy feeling that "a camera is trained on him or herself" in the surroundings even if the imaging section does not operate. In order to ease such an uneasy feeling, in the present embodiment, the light transmissive member 82 is formed to have a rectangular shape to make it difficult to figure out that the imaging device 8 is a camera. It should be noted that as the configuration of the light transmissive member 82, there can be adopted a configuration in which the light transmissive member 82 functions as a lens providing waterproof and dustproof of the imaging device 8 can be achieved, and at the same time, the surface is difficult to be scratched.

Configuration of Optical Device

Figure 3:
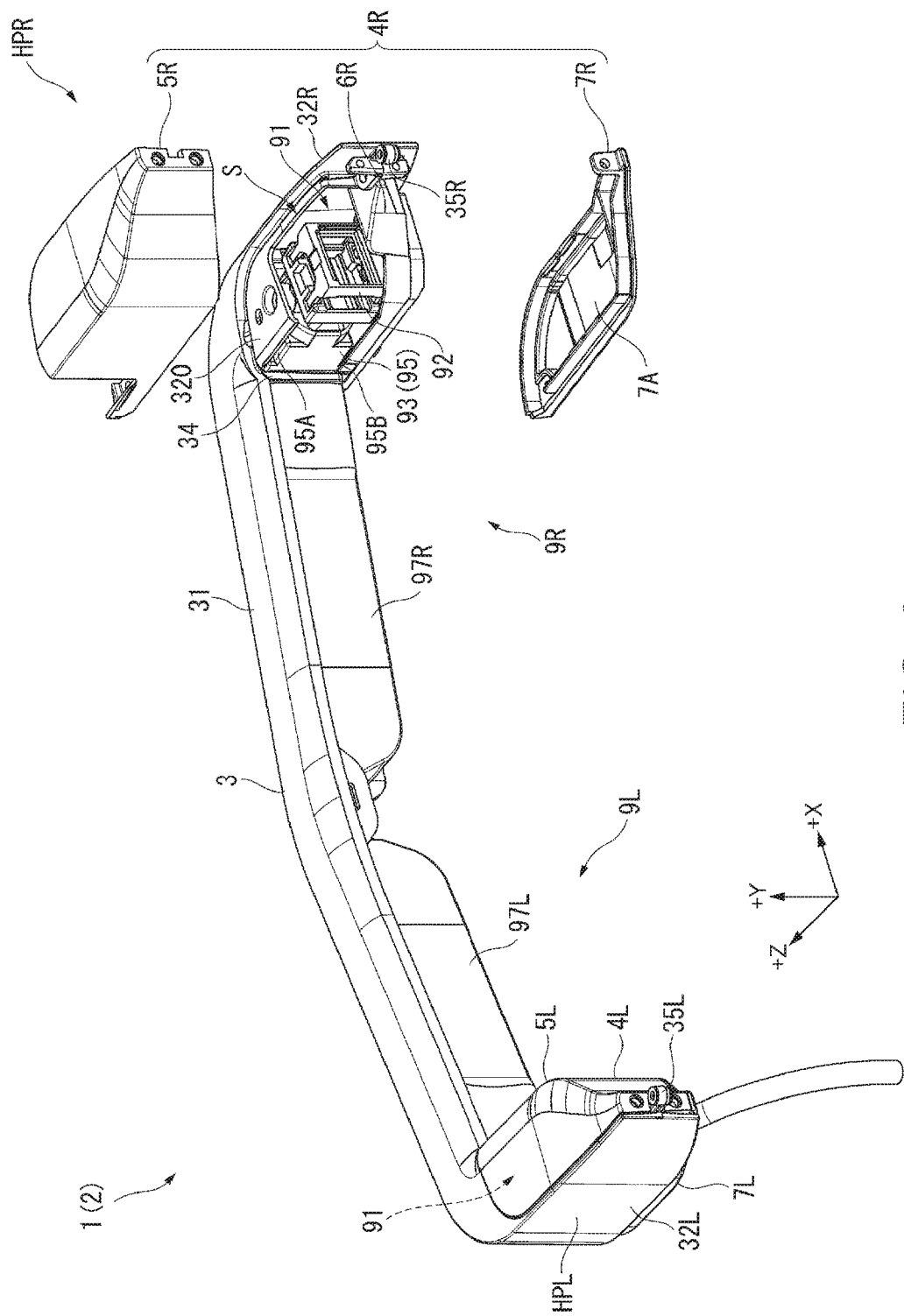
FIG. 3 is a perspective view showing the HMD with an upper part case and a lower part case removed in the embodiment.
Figure 4:
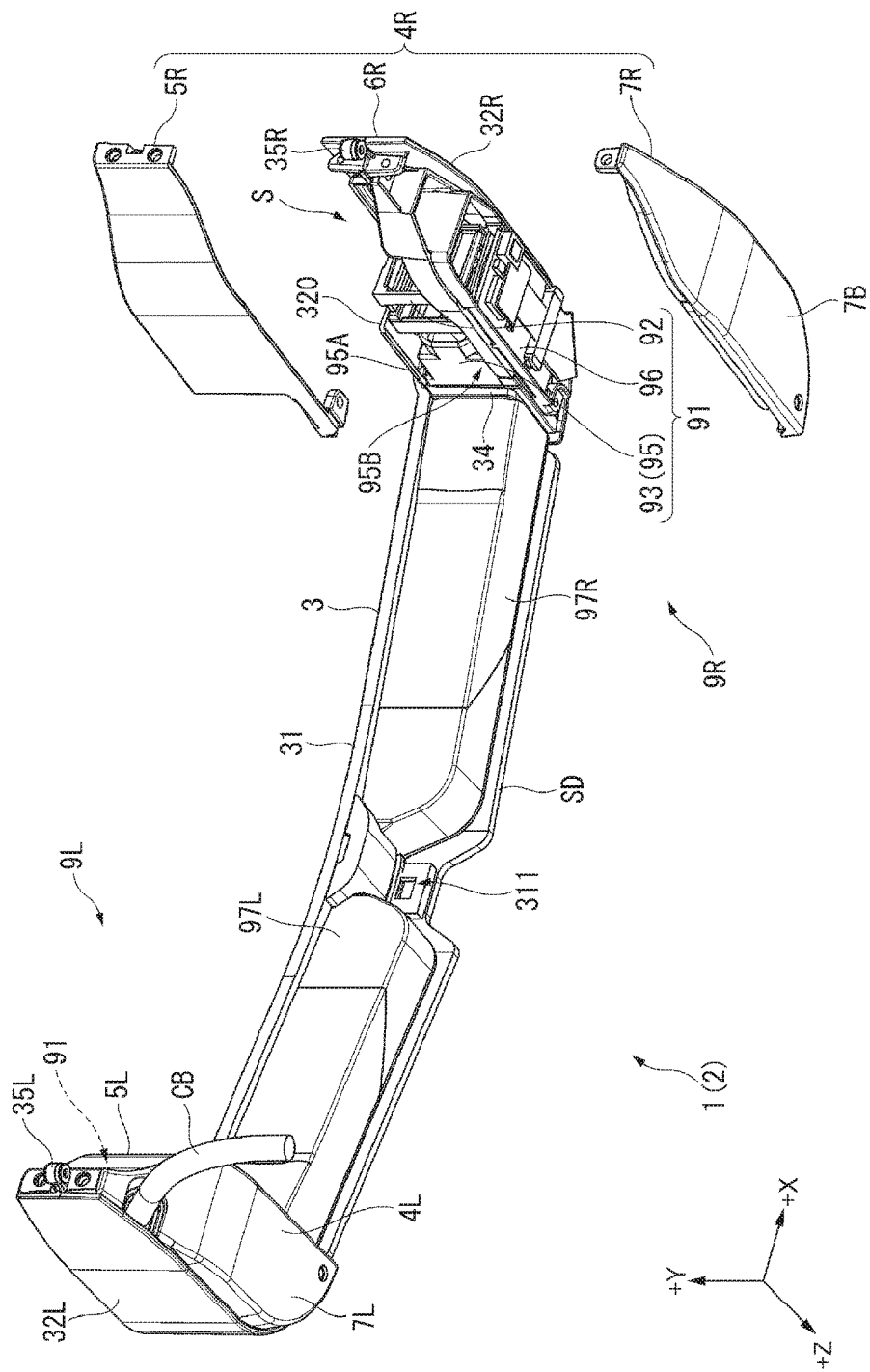
FIG. 4 is a perspective view showing the HMD with the upper part case and the lower part case removed in the embodiment.

FIG. 3 and FIG. 4 are perspective views of the HMD 1, from which with an upper part case 5R and a lower part case 7R constituting the case member 4R are removed, viewed from the upper back side and viewed from the lower back side, respectively. It should be noted that in FIG. 3 and FIG. 4, the temples TML, TMR are omitted from the illustration.

The optical device 9R is located on the right side in the frame 2, the optical device 9L is located on the left side. The optical devices 9R, 9L each display an image corresponding to the image signal input from the outside so that the user can visually recognize the image. As shown in FIG. 3 and FIG. 4, among these optical devices, the optical device 9R has the image projection section 91 and the control section 96 each disposed in the housing section HPR constituted by the side surface part 32R and the case member 4R combined with each other, and the light guide member 97R supported by the front part 31.

It should be noted that although in the following description, the optical device 9R will mainly be explained, the optical device 9L also has the image projection section 91, the control section 96, and the light guide member 97L similar to those of the optical device 9R although the optical device 9L is mirror symmetric with the optical device 9R.

Configuration of Image Projection Section

Figure 5:
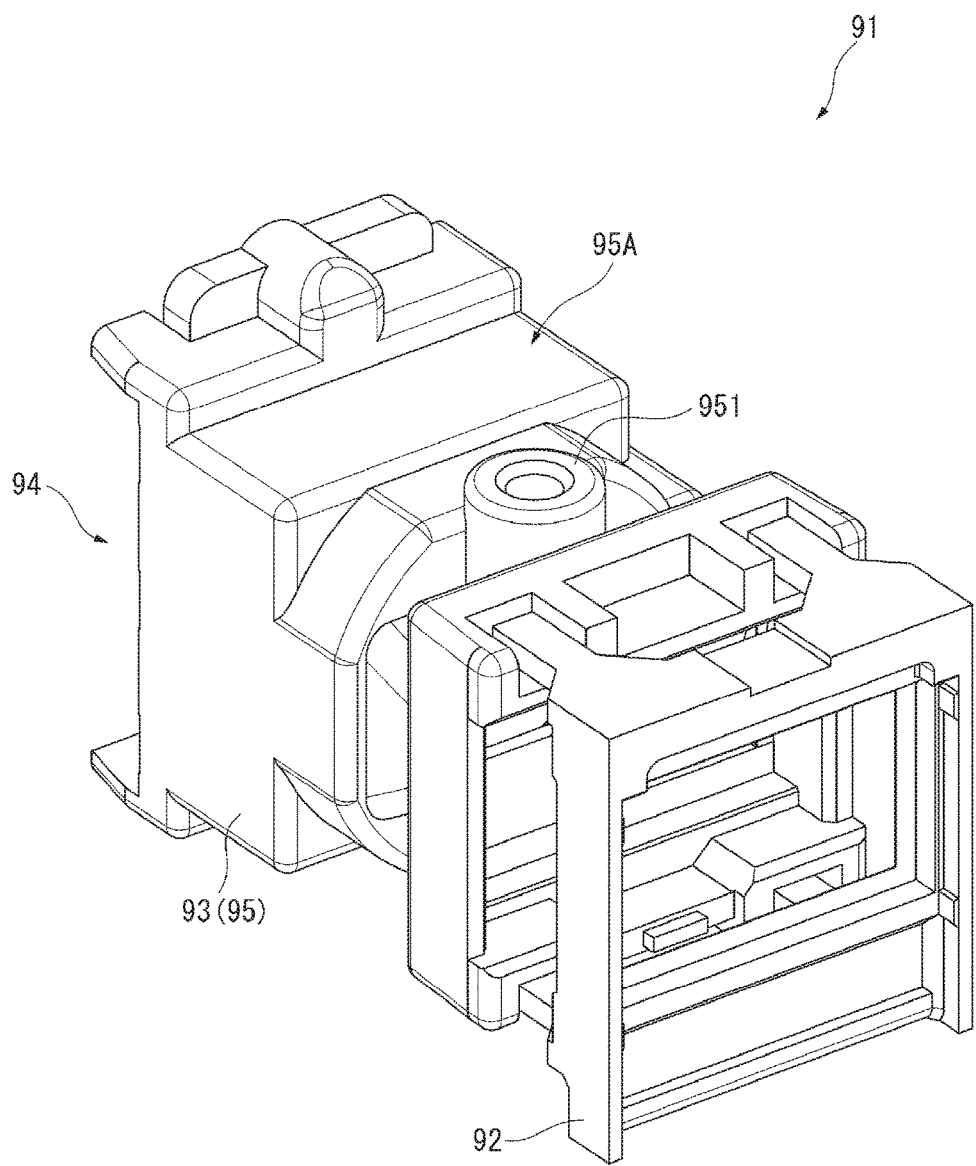
FIG. 5 is a perspective view showing an image projection section in the embodiment.
Figure 6:
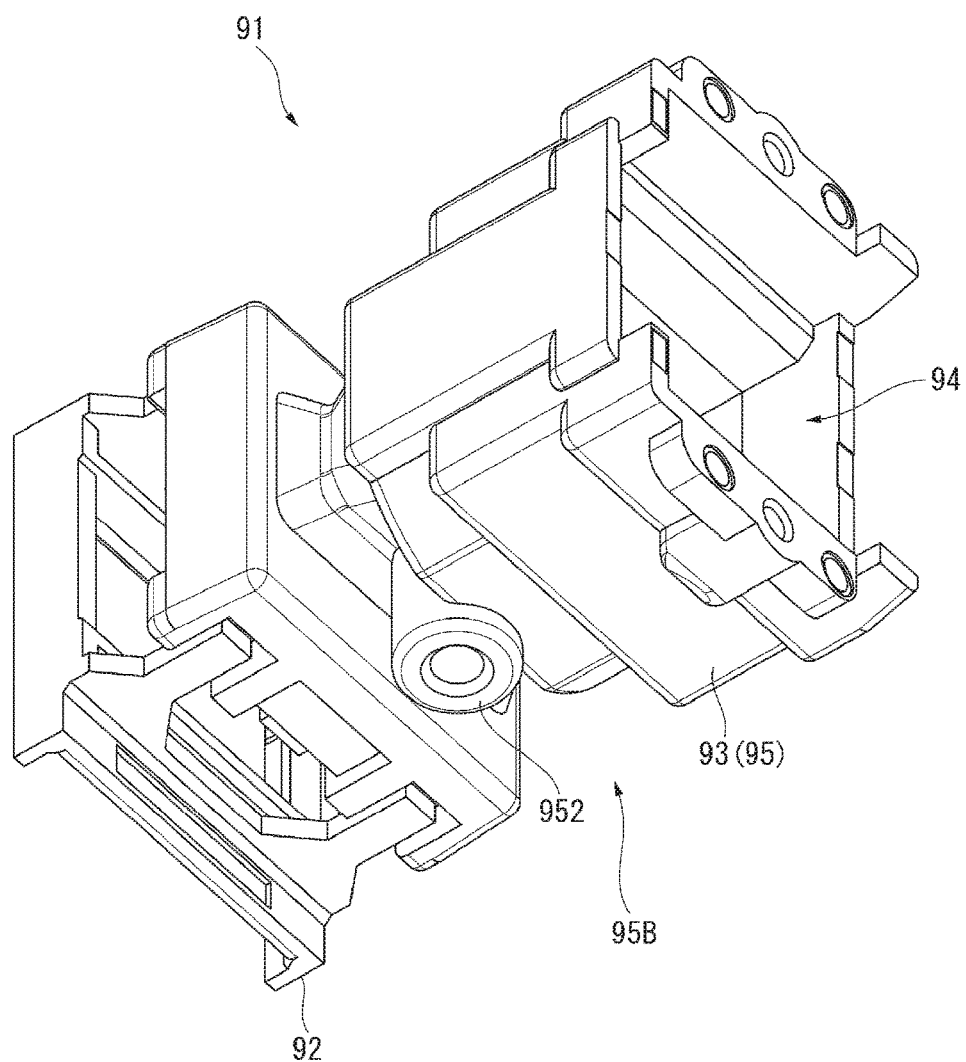
FIG. 6 is a perspective view showing the image projection section in the embodiment.

FIG. 5 is a perspective view of the image projection section 91 viewed from above on the opposite side (the back side) to the projection side of the image light, and FIG. 6 is a perspective view of the image projection section 91 viewed from below on the projection side (the front side) of the image light. It should be noted that in FIG. 5 and FIG. 6, the frame member of an image forming device 92 is illustrated, and illustration of the display panel is omitted.

The image projection section 91 of each of the optical devices 9R, 9L is for projecting image light (the light for forming the image) on corresponding one of the light guide members 97R, 97L, and is one of housed members to be housed in corresponding one of the housing sections HPR, HPL. As shown in FIG. 5 and FIG. 6, the image projection section 91 is configured as an integrated unit having the image forming device 92 and the projection optical device 93 combined with each other.

The image forming device 92 is an image forming section for forming the image light corresponding to the image signal input from the outside via a cable CB under the control by the control section 96. In the present embodiment, the image forming device 92 is formed of a self-luminescent display panel such as an organic electroluminescence (EL) panel. However, the image forming device 92 is not limited to this configuration, but can also be formed of a combination of a light source such as a light emitting diode (LED) and a light modulation device such as a transmissive or reflective liquid crystal panel or a device using a micromirror such as an MEMS mirror.

Such an image forming device 92 and the frame main body 3 (a fixation part 320 described later or the side surface parts 32R, 32L) are connected to each other with a thermally-conductive member not shown. Thus, the heat generated in the image forming device 92 can be conducted to the frame main body 3, which is a metal member exposed to the outside, and then radiated to the outside in the frame main body 3.

The projection optical device 93 projects the image light formed by the image forming device 92 to the corresponding one of the light guide members 97R, 97L. The projection optical device 93 is configured as a combination lens provided with a plurality of lenses 94 and a lens tube 95 for housing the plurality of lenses 94. It should be noted that it is also possible to adopt a prism (a projection prism) instead of at least one of the plurality of lenses providing the image light input from the image forming device 92 can be guided to the light guide members 97R, 97L.

The lens tube 95 has a fixation part 951 as a screw hole on an upper end surface 95A as shown in FIG. 5, and has a fixation part 952 as a screw hole on a lower end surface 95B as shown in FIG. 6. Further, as shown in FIG. 3, the lens tube 95 is fixed to a fixation part 33 of the frame main body 3 with the fixation part 951. To the fixation part 952 of the lens tube 95, there is attached the substrate holder 6R as shown in FIG. 4. Therefore, the image projection section 91 including the lens tube 95 is covered with the substrate holder 6R from the lower side. Although the illustration is omitted, the image projection section 91 of the optical device 9L is also covered with a similar substrate holder from the lower side.

The control section 96 constituting the optical device 9L makes the image forming device 92 constituting the optical device 9L together with the control section 96 operate in accordance with the image signal supplied from the outside via the cable CB connected to the left side housing section HPL. Further, the control section 96 constituting the optical device 9R makes the image forming device 92, which constitutes the optical device 9R together with the control section 96, operate in accordance with the image signal input from the control section 96 of the optical device 9L via a signal line (not shown) passing between the front part 31 and the light guide members 97R, 97L. These control sections 96 are each one of the housed members housed in each of the housing section HPR, HPL described above.

It should be noted that a control circuit for controlling the imaging device 8 described above is installed in the control section 96 of the optical device 9R.

The right side light guide member 97R and the left side light guide member 97L each constitute a display section according to the invention. These light guide members 97R, 97L are disposed in front of the right and left eyes of the user, and guide the image light emitted from the corresponding image projection sections 91 to the right eye and the left eye of the user, respectively.

Specifically, the light guide member 97R makes the image light for the right eye, which has been projected from the image projection section 91 of the optical device 9R, be internally reflected by the interface to proceed toward the center, and thus guides the image light to the right eye with a semi-transmissive layer disposed at a position corresponding to the right eye of the user. The same applies to the light guide member 97L for guiding the image light for the left eye to the left eye.

These light guide members 97L, 97R are each formed of resin (e.g., cycloolefin polymer) exhibiting a high light transmissive property in the visible light range. Therefore, it is possible for the user to observe the external world via the light guide members 97R, 97L disposed in front of the right and left eyes.

Configuration of Side Surface Parts

Figure 7:
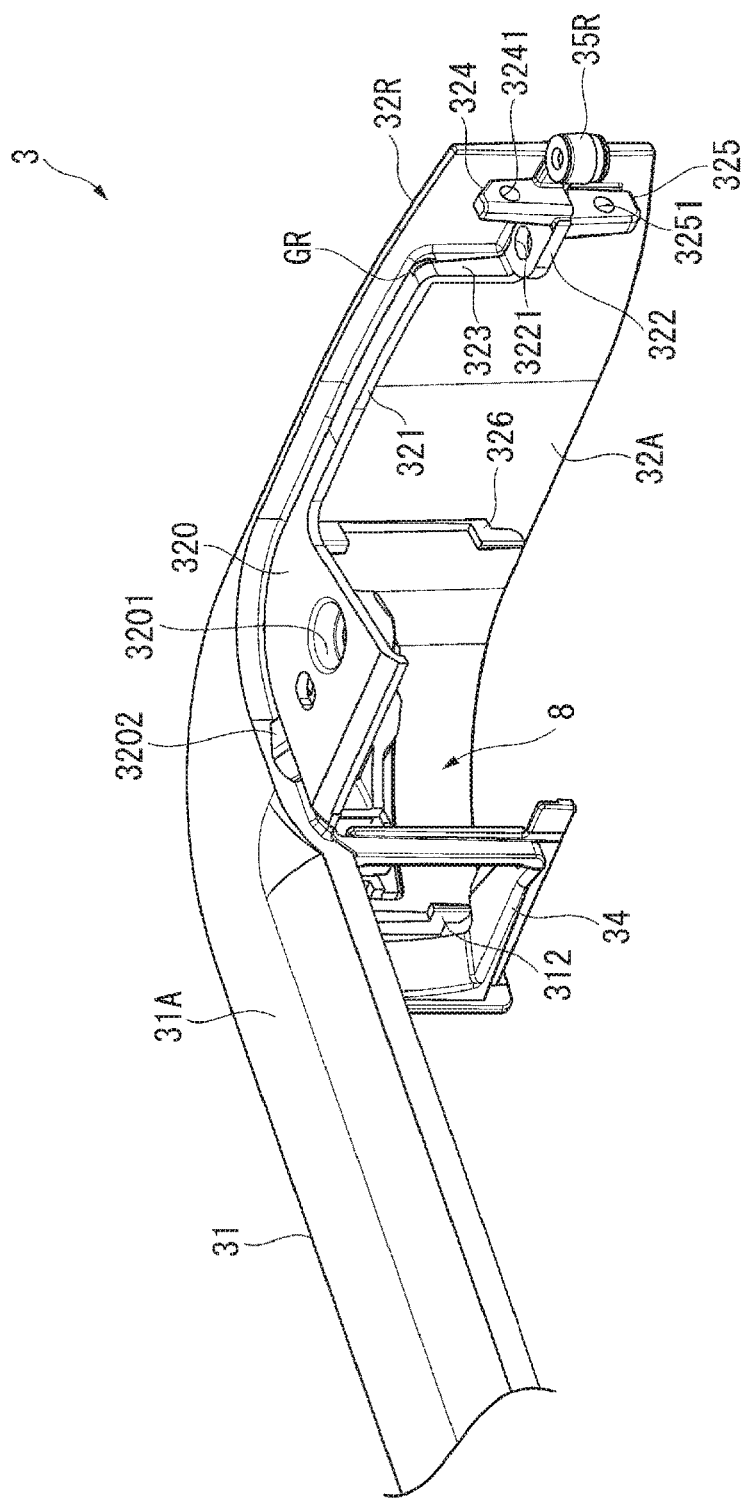
FIG. 7 is a perspective view showing a frame main body in the embodiment.
Figure 8:
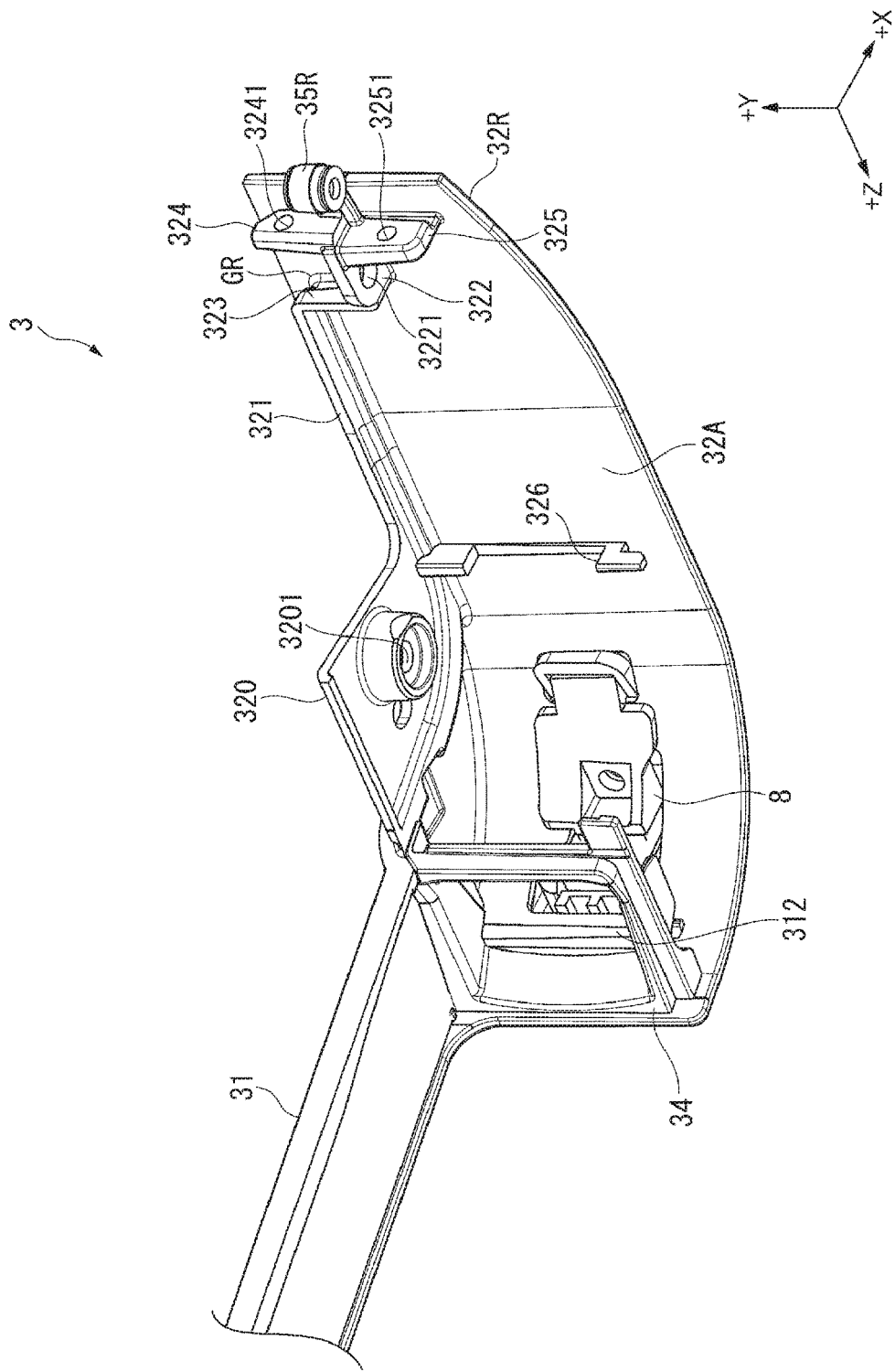
FIG. 8 is a perspective view showing the frame main body in the embodiment.

FIG. 7 and FIG. 8 are perspective views showing the frame main body 3. Specifically, FIG. 7 is a perspective view of an inner surface 32A of the side surface part 32R constituting the frame main body 3 viewed from the upper back side, and FIG. 8 is a perspective view of the side surface part 32R viewed from the lower back side.

As described above, the frame main body 3 has the front part 31 and the right and left side surface parts 32R, 32L.

As shown in FIG. 7 and FIG. 8, the side surface part 32R has the fixation part 320 rising from the inner surface 32A on the user side to be connected to the upper surface of the right side end part 31R described above, ribs 321 through 325 each rising from the inner surface 32A in a similar manner, and a watertight member 34.

The fixation part 320 corresponds to a first fixation part according to the invention, and is located in a region, which is on the back side of the right side end part 31R of the front part 31 described above, and is displaced downward from the upper end surface 31A of the front part 31 described above. The fixation part 320 is a plane part (a plane part along the X-Z plane) along the lateral direction.

The fixation part 320 has a hole part 3201, through which a screw to be screwed to the fixation part 951 of the lens tube 95 disposed below the fixation part 320 is inserted from above, and in addition has a projecting part 3202, which is for positioning the upper part case 5R, in an edge part on the front side in the fixation part 320.

Such a fixation part 320 projects from the inner surface 32A of the side surface part 32R, and can therefore be called a rib with a large projection amount.

It should be noted that although not shown in the drawings, the side surface part 32L also has a similar fixation part 320.

The ribs 321, 322 correspond to a first rib according to the invention, and extend along the extending direction (a first direction) of the side surface part 32R from the front part 31. Specifically, the rib 321 is disposed at a position in the vicinity of the upper end of the side surface part 32R so as to be contiguous with the fixation part 320 described above, and extend to a position in the vicinity of the end part on the back side. In other words, together with the fixation part 320, the rib 321 extends from the end part on the front side toward the back side in the side surface part 32R along the extending direction of the side surface part 32R from the front part 31.

The rib 322 is formed at a position, which is roughly the center in the vertical direction in the side surface part 32R, and is on the back side.

The ribs 323 through 325 correspond to a second rib according to the invention, and extend along a direction (a second direction) roughly perpendicular to the extending direction of the side surface part 32R from the front part 31. Specifically, the rib 323 connects an end part on the backside in the rib 321 and an end part on the front side in the rib 322 to each other. The rib 324 extends upward from an end part on the back side in the rib 322, and the rib 325 extends downward from the end part. These ribs 324, 325 are connected to the support part 35R for rotatably supporting the temple TMR. Therefore, the support part 35R is formed integrally with the side surface part 32R.

Such ribs 321 through 325 each have a function of increasing the strength of the side surface part 32R.

Among these ribs, the ribs 322, 324, and 325 each have a case fixation part for fixing the case member 4R.

Specifically, the case fixation part 3221 provided to the rib 322 is a hole part through which a screw to be screwed in a screw hole 516 (FIG. 9) of the upper part case 5R through the substrate holder 6R is inserted.

The case fixation part 3241 provided to the rib 324 is a screw hole in which a screw inserted through the upper part case 5R is screwed from the back side.

The case fixation part 3251 provided to the rib 325 is a screw hole in which a screw inserted through the upper part case 5R and the lower part case 7R is screwed.

As described above, the end parts on the back side of the upper part case 5R, the substrate holder 6R, and the lower part case 7R are fixed by the ribs 322, 324, and 325 located on the back side in the side surface part 32R, respectively.

The ribs 321 through 324 among the ribs 321 through 325 described above, and the fixation part 320 connected to each other are provided with a groove part GR. In the detailed description, on the upper surface of each of the fixation part 320 described above, and the ribs 321 through 324 connected to the fixation part 320 and reaching the end part on the back side of the side surface part 32R, there is formed the groove part GR extending along the extending direction of the side surface part 32R from the front part 31 so that the inner surface 32A and the inner surface of the groove part GR are connected to each other. In other wards, the groove part GR is formed throughout roughly the entire area from the end part on the front part 31 side to the end part on the opposite side to the front part 31 side in the side surface part 32R. It should be noted that as shown in FIG. 7, the base end part on the front side of the groove part GR is located at a position in the vicinity of the projecting part 3202 of the fixation part 320.

At roughly the center of the inner surface 32A described above, there is disposed an engagement part 326, which is engaged by a hook-like part 613 (FIG. 10) provided to the substrate holder 6R, so as to project. Further, on the inner surface in the sight side end part 31R of the front part 31, there is formed an engagement part 312, which is engaged by a hook part 64 (see FIG. 10) similarly provided to the substrate holder 6R.

It should be noted that although the illustration is omitted, the side surface part 32L having a mirror symmetric structure with the side surface part 32R also has the fixation part 320 described above, the ribs 321 through 325, and the engagement part 326, and on the inner surface in the left side end part 31L, there is disposed a similar engagement part to the engagement part 312 so as to project.

The watertight member 34 is formed to have a frame-like shape surrounding the periphery of the end part on the right side in the light guide member 97R supported by the front part 31, and is attached to the end part, and is disposed at a position near to the center of the front part 31 from the right side end part 31R. The watertight member 34 prevents a gap, through which dust or a liquid enters, from occurring between the light guide member 97R and the frame main body 3.

It should be noted that although the illustration is omitted, the watertight member 34 shaped like a frame is also disposed in the periphery of the end part on the left side of the light guide member 97L.

Configuration of Case Member

As shown in FIG. 3 and FIG. 4, the case member 4R, which is combined with the side surface part 32R to constitute the housing section HPR, has the upper part case 5R, the substrate holder 6R, and the lower part case 7R. Further, the case member 4L combined with the side surface part 32L to constitute the housing section HPL also has the upper part case 5L, the substrate holder (not shown), and the lower part case 7L having the mirror symmetric structures respectively with the upper part case 5R, the substrate holder 6R, and the lower part case 7R.

Configuration of Upper Part Case

Figure 9:
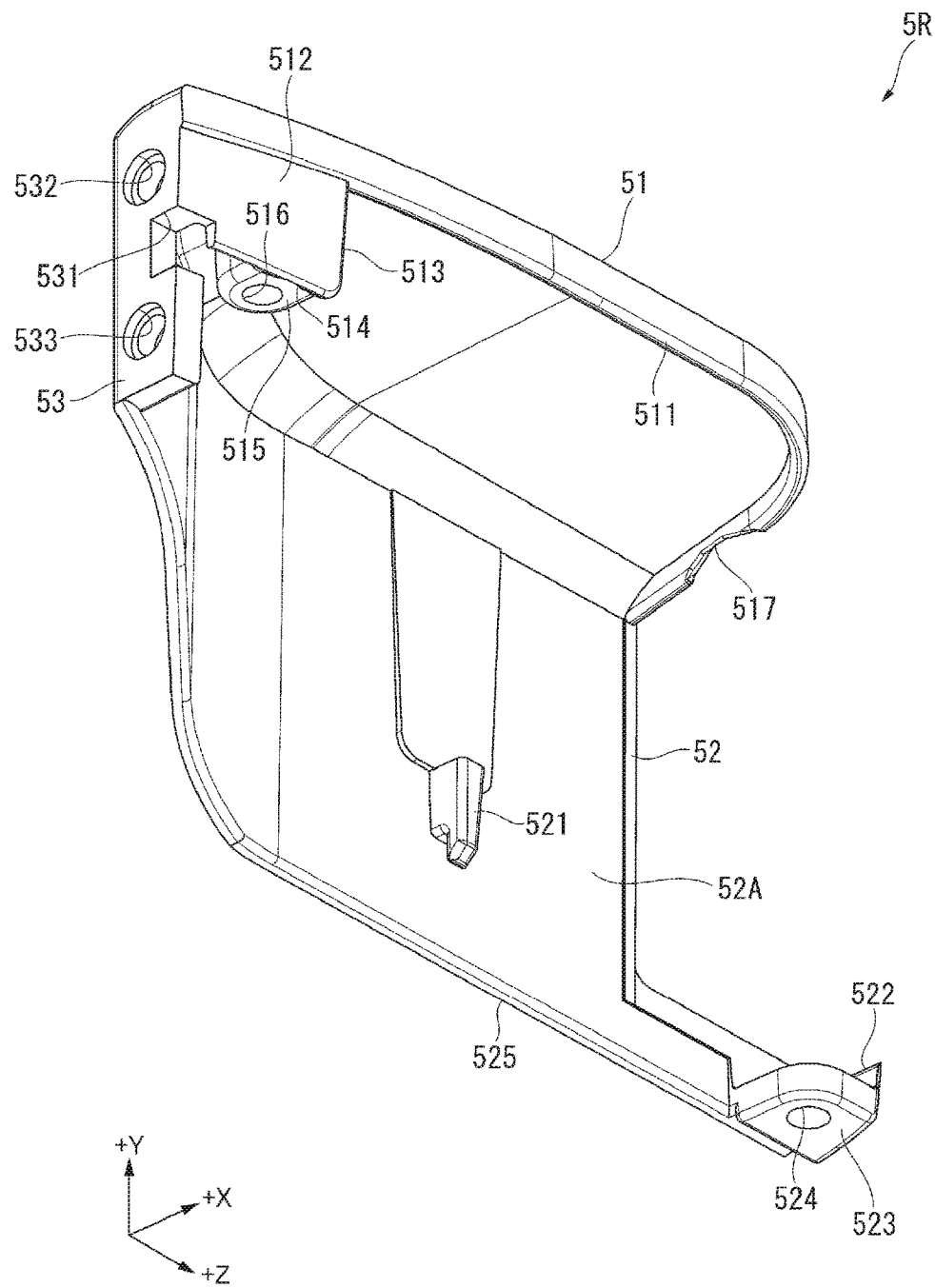
FIG. 9 is a perspective view showing the upper part case in the embodiment.

FIG. 9 is a perspective view of the upper part case 5R viewed from below on the side surface part 32R side.

The upper part case 5R is a member for covering the image projection section 91 (the lens tube 95) from above, and corresponds to a first case according to the invention. As shown in FIG. 9, the upper part case 5R has an upper surface part 51 to be connected to the side surface part 32R, a side surface part 52 hanging down from the end part on the user side in the upper surface part 51 to be opposed to the side surface part 32R, and a back surface part 53 crossing the upper surface part 51 and the side surface part 52.

The upper surface part 51 has a projecting part 511, which projects downward along an edge on the opposite side to the side surface part 52 side, disposed at the edge. Further, the upper surface part 51 has a projecting part 512, which projects further downward from the projecting part 511, disposed in a region on the back surface side in that edge. Among these parts, a tip surface of the projecting part 511 is inserted in the groove part GR provided to each of the fixation part 320 and the ribs 321 to have contact with a bottom part of the groove part GR when the upper part case 5R is combined with the side surface part 32R. Further, the projecting part 512 is inserted in the groove part GR provided to the ribs 323, 322 described above, and an edge 513 on the front side and an edge 514 on the lower side in the projecting part 512 have contact with the bottom part of the groove part GR provided to the ribs 323, 322. In other words, the projecting parts 511, 512 have a projecting shape integrally projecting downward, and are inserted in the groove part GR provided to the fixation part 320 and the ribs 321 through 324 to have contact with the bottom part of the groove part GR. In other words, the projecting parts 511, 512 are contacting parts to the ribs 323, 322. It should be noted that the edge 513 extending along the vertical direction is not required to have contact with the bottom surface of the opposed region in the groove part GR.

In the inner surface (the inner surface facing downward) of the upper surface part 51, there is formed a boss 515 projecting from the inner surface, and the boss 515 is provided with a screw hole 516.

In the edge on the front side in the upper surface part 51, there is formed a recessed part 517. In the recessed part 517, there is fitted a projecting part 3202 of the fixation part 320 described above when the upper part case 5R is combined with the frame main body 3, thus, the upper part case 5R is positioned.

The side surface part 52 has a hook-like part 521, projecting parts 522, 523, and a hole part 524.

The hook-like part 521 is provided to the inner surface 52A (the inner surface 52A opposed to the side surface part 32R) of the side surface part 52 so as to face downward. The hook-like part 521 engages with the substrate holder 6R.

The projecting part 522 is formed so as to project from the lower end part on the front side of the side surface part 52 toward the front side.

The projecting part 523 projects from the tip part of the projecting part 522 toward the side surface part 32R side. The projecting part 523 is a region to be combined with the lower part case 7R.

The hole part 524 is provided to the projecting part 523, and a screw to be screwed in the substrate holder 6R through the lower part case 7R is inserted into the hole part 524 from below.

The lower end part 525 of such a side surface part 52 has contact with an upper surface 73A (FIG. 12) of an outside step part 73 of the lower part case 7R when the upper part case 5R is combined with the lower part case 7R.

The back surface part 53 is located on the back side to the ribs 324, 325 when the upper part case 5R is combined with the side surface part 32R. The back surface part 53 has a recessed part 531 located at roughly the center, and in addition, has two hole parts 532, 533 located at positions across the recessed part 531 in the vertical direction.

The recessed part 531 is a recessed part for exposing the support part 35R connected to the ribs 324, 325 of the side surface part 32R to the outside.

Among the hole parts 532, 533, the hole part 532 located on the upper side is a hole part through which a screw fixed to the case fixation part 3241 described above is inserted, and by fixing the screw to the case fixation part 3241, the upper part case 5R is fixed to the side surface part 32R.

The hole part 533 located on the lower side is a hole part through which a screw to be fixed to the case fixation part 3251 described above is inserted, and the screw is inserted through a hole part 78 (FIG. 12) of the lower part case 7R besides the hole part 533.

Configuration of Substrate Holder

Figure 10:
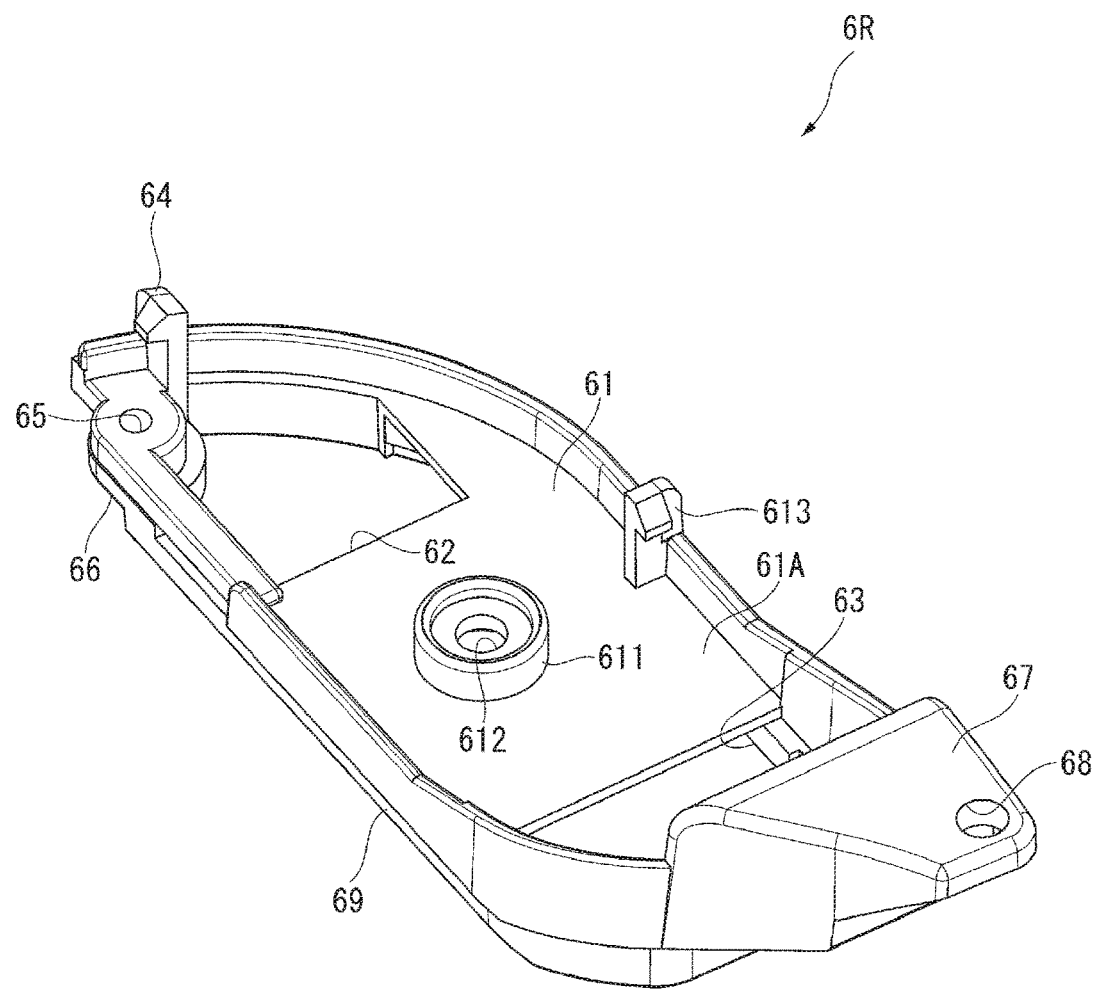
FIG. 10 is a perspective view showing a substrate holder in the embodiment.
Figure 10:
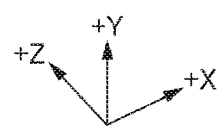
Figure 11:
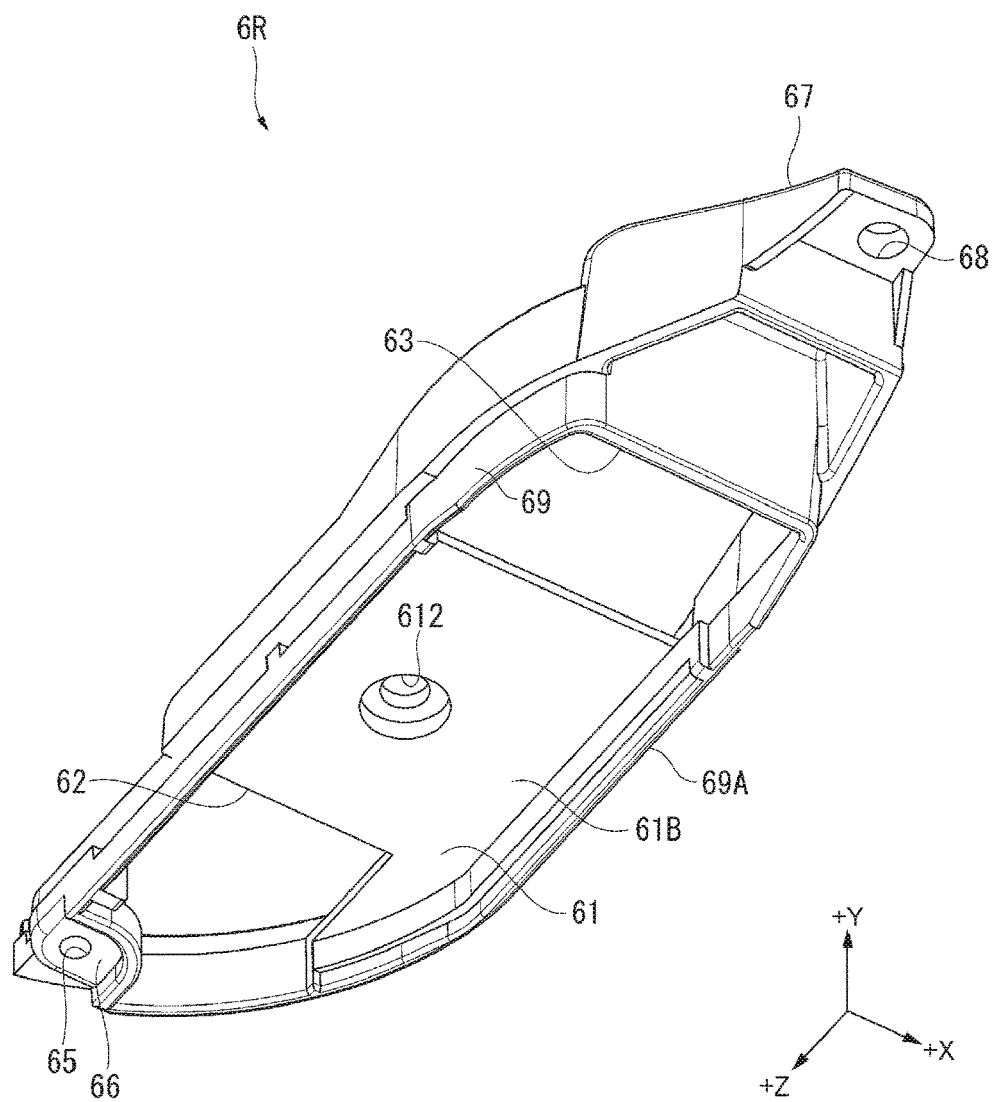
FIG. 11 is a perspective view showing the substrate holder in the embodiment.

FIG. 10 is a perspective view of the substrate holder 6R viewed from upper back side, and FIG. 11 is a perspective view of the substrate holder 6R viewed from the lower back side.

The substrate holder 6R corresponds to a second case according to the invention, and is a member fixed to the lens tube 95 to cover the lens tube 95 from below. As shown in FIG. 10 and FIG. 11, the substrate holder 6R is formed to have a frame-like shape having an edge on the right side disposed along the side surface part 32R, edges on the left side and the back side respectively disposed along the edges on the left side and the back side in the upper part case 5R, and a peripheral edge rising upward. The width dimension (the dimension in the +X direction as the width direction) in the substrate holder 6R is made smaller than the width dimension in the same direction in the upper part case 5R described above, and the substrate holder 6R is disposed in a space surrounded by the upper part case 5R and the side surface part 32R.

Such a substrate holder 6R has a fixation part 61, opening parts 62, 63, a hook-like part 64, a screw hole 65, a recessed part 66, a projecting part 67, a hole part 68, and a lower end part 69.

The fixation part 61 corresponds to a second fixation part according to the invention. The fixation part 61 is a region, which is formed to have a plate-like shape at roughly the center of the substrate holder 6R, and is fixed to the lens tube 95 described above on the upper surface 61A side, and in which the control section 96 is disposed on the lower surface 61B side. At roughly the center of the upper surface 61A, there is disposed a boss 611 having a hole part 612 so as to project upward. By fixing a screw, which is inserted through the hole part 612 from below, to the fixation part 952 of the lens tube 95 described above, the substrate holder 6R is fixed to the lens tube 95.

Further, on the upper surface 61A, there is disposed the hook-like part 613 as a positioning part so as to project. The hook-like part 613 engages with the engagement part 326 described above of the frame main body 3.

The opening part 62 is located on the front side with respect to the fixation part 61. Through the opening part 62, there is inserted a flexible printed board FPC (FIG. 13) including the signal line to be connected to the control section 96 disposed below the fixation part 61 and a signal line extending from the imaging device 8.

The opening part 63 is located on the back side with respect to the fixation part 61. Through the opening part 63, there is inserted a signal line (not shown) extending from the image forming device 92 integrated with the lens tube 95 and connected to the control section 96.

The hook-like part 64 is a positioning part located at an end part on the front side in the substrate holder 6R. The hook-like part 64 engages with the engagement part 312 (FIG. 7 and FIG. 8) described above.

The screw hole 65 is formed in the vicinity of the hook-like part 64. To the screw hole 65, there is fixed a screw inserted through the hole part 76 (FIG. 12) of the lower part case 7R and the hole part 524 (FIG. 5) of the upper part case 5R from below.

The recessed part 66 is formed on the lower surface side of the region provided with the screw hole 65. In the recessed part 66, there is fitted the projecting part 523 (FIG. 9) of the upper part case 5R.

The projecting part 67 is located on the back side in the substrate holder 6R, and projects above the rising part formed on the peripheral edge of the substrate holder 6R. The projecting part 67 has contact with the lower surface (FIG. 7) of the rib 322 described above when the substrate holder 6R is combined with the side surface part 32R.

The hole part 68 is provided to the projecting part 67. Through the hole part 68, a screw to be fixed to the screw hole 516 (FIG. 9) of the upper part case 5R through the case fixation part 3221 (FIG. 7 and FIG. 8) is inserted from below.

The lower end part 69 projects downward from the region slightly inner than the peripheral edge of the substrate holder 6R, and surrounds the periphery (the periphery in the ±X direction and the ±Z direction) of the control section 96 disposed below the fixation part 61 as shown in FIG. 4. The lower end part 69 is located further below the lower surface 61B on which the control section 96 is disposed, and a tip surface 69A (a surface facing downward in the lower end part 69) of the lower end part 69 has contact with an inside step part 72 (FIG. 12) described later in the lower part case 7R.

Configuration of Lower Part Case

Figure 12:
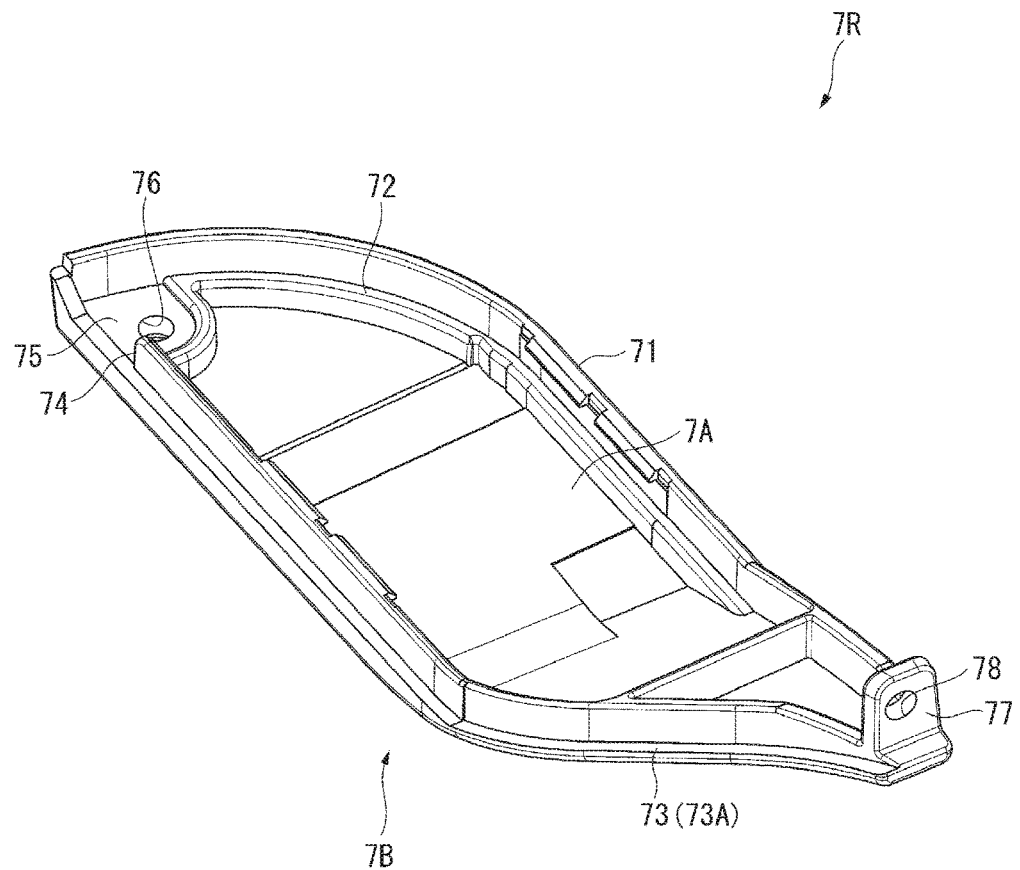
FIG. 12 is a perspective view showing the lower part case in the embodiment.
Figure 12:
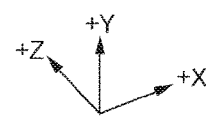

FIG. 12 is a perspective view of the lower part case 7R viewed from the upper back side.

The lower part case 7R corresponds to a third case according to the invention. The lower part case 7R is a member, which covers the substrate holder 6R from below, and is combined with the upper part case 5R and the side surface part 32R to constitute the outer edge of the housing section HPR.

As shown in FIG. 12, the lower part case 7R is formed to have a shape having an edge on the right side disposed along the side surface part 32R, edges on the left side and the back side respectively disposed along the edges on the left side and the back side in the upper part case 5R similarly to the outer shape of the substrate holder 6R. Besides the above, the end part on the back side in the lower part case 7R is formed so as to be tilted toward the upper side.

Such a lower part case 7R has a rising part 71, the inside step part 72, the outside step part 73, a cutout 74, a flat part 75, a hole part 76, a rising part 77, and the hole part 78.

The rising part 71 rises upward from the peripheral edge in the bottom surface 7A (an opposed surface opposed to the substrate holder 6R) of the lower part case 7R. The rising part 71 is formed to have an outer edge shape roughly coinciding with the outer edge shape of the substrate holder 6R viewed from above. It should be noted that in the case in which the lower part case 7R engages with the side surface part 32R, the side surface on the outer side in the rising part 71 on the right side (the +X direction side) in the lower part case 7R has contact with the lower end part in the inner surface 32A of the side surface part 32R.

The inside step part 72 is formed inside the rising part 71 so that the upper surface is located on the lower side of the upper end of the rising part 71, and is located on the upper side of the bottom surface 7A (a surface facing upward) of the lower part case 7R. The lower end surface of the lower end part 69 (FIG. 10 and FIG. 11) of the substrate holder 6R has contact with the upper surface of the inside step part 72, and thus, a configuration space in which the control section 96 is disposed is formed between the lower surface 61B of the fixation part 61 in the substrate holder 6R and the bottom surface 7A of the lower part case 7R. In other words, the lower end part 69 of the substrate holder 6R is housed in the rising part 71, and thus, not only the periphery of the control section 96 is surrounded, but also the control section 96 is covered with the fixation part 61 (FIG. 10 and FIG. 11) from above, and is covered with the bottom surface 7A from below.

The outside step part 73 is formed outside the rising part 71 in the lower part case 7R so that the upper surface is located on the lower side of the upper end of the rising part 71, and is located on the upper side of the lower surface 7B (a surface facing downward) of the lower part case 7R. The lower end part 525 (see FIG. 9) of the side surface part 52 in the upper part case 5R has contact with the upper surface of the outside step part 73. Thus, it is possible to make the joint between the lower part case 7R, and the upper part case 5R and the side surface part 32R inconspicuous, and in addition, it is possible to prevent the gap from being generated between these constituents.

The cutout 74 is formed in the end part on the front side in the lower part case 7R by cutting a part of the rising part 71.

The flat part 75 is located inside the lower part case 7R corresponding to the cutout 74. Between the flat part 75 and the recessed part 66 (see FIG. 11) of the substrate holder 6R, there is disposed the projecting part 523 of the upper part case 5R (see FIG. 9) inserted through the cutout 74.

The hole part 76 is provided to the flat part 75, and a screw inserted through the hole part 76 from below is fixed to the screw hole 65 (see FIG. 11) provided to the substrate holder 6R through the hole part 524 provided to the projecting part 523. Thus, the upper part case 5R, the substrate holder 6R, and the lower part case 7R are fixed on the front side.

The rising part 77 rises upward from the end part on the back side of the lower part case 7R.

The hole part 78 is provided to the rising part 77. Through the hole part 78, there is inserted a screw inserted through the hole part 533 (FIG. 9) of the upper part case 5R, and the screw is fixed to the case fixation part 3251 (FIG. 7 and FIG. 8) located in the rib 325 described above.

Figure 13:
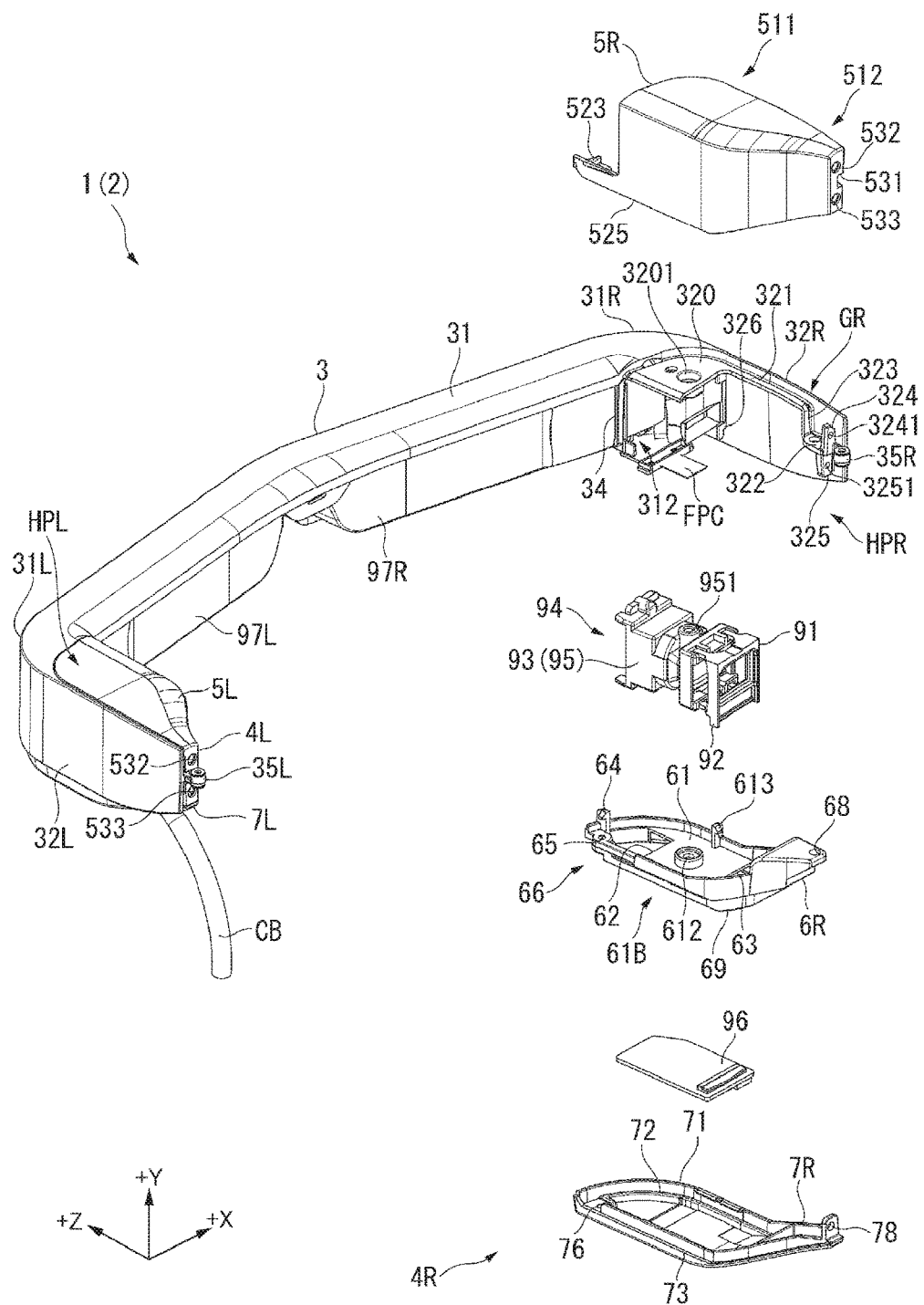
FIG. 13 is a diagram for explaining an attachment process of the image projection section, a control section, and a case member to the frame main body in the embodiment.

Mounting of Image Projection Section, Control Section, and Case Member to Frame Main Body FIG. 13 is a diagram for explaining the mounting process of the image projection section 91 and the control section 96 provided to the optical device 9R, and the case member 4R to the frame main body 3.

In the case of mounting the image projection section 91 and the control section 96 of the optical device 9R and the case member 4R to the frame main body 3, firstly, a screw inserted through the hole part 3201 of the fixation part 320 of the side surface part 32R from above is fixed to the fixation part 951 of the lens tube 95 as shown in FIG. 13. Thus, the image projection section 91 is fixed to the fixation part 320.

Then, the substrate holder 6R is fixed to the image projection section 91 (the lens tube 95) from below. Specifically, the substrate holder 6R is attached to the frame main body 3 so that the hook-like parts 613, 64 as the positioning parts respectively engage with the engagement parts 326, 312 of the frame main body 3. In this state, the upper end of the projecting part 67 has contact with the lower surface of the rib 322. In such a state, a screw inserted through the hole part 612 from below is fixed to the fixation part 952 of the lens tube 95. Thus, the substrate holder 6R is fixed to the image projection section 91 so as to cover the image projection section 91 from below, and at the same time, the substrate holder 6R is tentatively fixed (positioned) to the frame main body 3.

Subsequently, the control section 96 is disposed on the lower surface 61B of the fixation part 61 in the substrate holder 6R. On this occasion, the flexible printed board FPC inserted through the opening part 62 is connected to the control section 96, and at the same time, the signal line (not shown) of the image forming device 92 inserted through the opening part 63 is connected to the control section 96.

Then, the upper part case 5R is attached so as to cover the image projection section 91 from above, then the lower part case 7R is attached so as to cover the substrate holder 6R from below, then the upper part case 5R and the lower part case 7R are combined with each other, and are further fixed to the side surface part 32R.

On this occasion, the upper part case 5R is combined with the side surface part 32R from the user side so that the projecting parts 511, 512 of the upper part case 5R have contact with the bottom part of the groove part GR provided to the fixation part 320 and the ribs 321 through 323 of the side surface part 32R. Thus, it results that a base end part (a connection part with the rib 324) of the support part 35R is located in the recessed part 531, and the projecting part 523 is located in the recessed part 66 of the substrate holder 6R.

In this state, a screw is inserted through the hole part 68 of the substrate holder 6R and the case fixation part 3221 (FIG. 7 and FIG. 8) from below, and then the screw is fixed to the screw hole 516 (FIG. 9) of the upper part case 5R. Thus, the side surface part 32R, and the upper part case 5R and the substrate holder 6R are fixed to each other on the back side.

Further, by fixing the screw inserted through the hole part 532 of the upper part case 5R to the case fixation part 3241 of the rib 324, the upper part case 5R is fixed to the side surface part 32R.

Meanwhile, the lower part case 7R is combined with the upper part case 5R, the substrate holder 6R, and the side surface part 32R so as to make the upper surface of the inside step part 72 of the lower part case 7R have contact with the lower end surface of the lower end part 69 of the substrate holder 6R, and at the same time make the lower edge of the lower end part 525 of the upper part case 5R have contact with the outside step part 73.

By inserting a screw through the hole part 76 of the lower part case 7R from below, then inserting the screw through the hole part 524 of the upper part case 5R, and then fixing the screw to the screw hole 65 of the substrate holder 6R in this state, the upper part case 5R, the substrate holder 6R, and the lower part case 7R are integrated with each other on the front side of the frame main body 3.

Further, a screw is inserted through the hole part 533 of the upper part case 5R, then the screw is inserted through the hole part 78 of the lower part case 7R, and is then fixed to the case fixation part 3251 of the rib 325. Thus, the upper part case 5R and the lower part case 7R are fixed to the side surface part 32R on the back side.

Due to such a process, it is possible to mount the image projection section 91 and the control section 96 of the optical device 9R and the case member 4R to the frame main body 3.

It should be noted that in the case of mounting the image projection section 91 and the control section 96 of the optical device 9L and the case member 4L to the frame main body 3, the mounting can be achieved by a similar process.

Advantages of Embodiment

According to the HMD 1 related to the present embodiment described hereinabove, the following advantages can be obtained.

The side surface part 32R has the ribs 321, 322 extending along the extending direction of the side surface part 32R from the front part 31, and the ribs 323 through 325 extending along the direction perpendicular to the extending direction. According to this configuration, in the case in which an impact is applied to the side surface part 32R, it is possible to resist the strain of the side surface part 32R due to the impact with at least either of the ribs 321 through 325. Therefore, the strength of the side surface part 32R can be increased. It should be noted that since the fixation part 320 described above also functions as a rib, the strength of the side surface part 32R can further be increased.

Further, since the strength of the side surface part 32R increases, the side surface part 32R can be formed to have a smaller thickness. Therefore, since reduction in weight of the HMD 1 can be achieved, and in addition, the housing section HPR can be formed to have a smaller thickness, it is possible to improve the wearing feeling of the HMD 1.

Due to the side surface part 32L having substantially the same configuration as that of the side surface part 32R, substantially the same advantages as described above can be obtained.

The ribs 321, 322 extending along the extending direction of the side surface part 32R from the front part 31 cross the ribs 323 through 325. Specifically, the ribs 321, 322 and the rib 323 are connected to each other, and the rib 322 and the ribs 324, 325 are connected to each other. According to this configuration, the strength of the side surface part 32R with respect to the impact described above can further be increased compared to the case in which the ribs 321 through 325 are separately disposed.

The optical device 9R is provided with the image projection section 91, which is housed in the housing space S constituted by the side surface part 32R and the case member 4R combined with each other, and projects an image on the light guide member 97R as the display section. Further, the case member 4R is provided with the upper part case 5R having contact with the fixation part 320 and the ribs 321 through 323, and covering the image projection section 91 from above, and the substrate holder 6R for covering the image projection section 91 from below. According to this configuration, the image projection section 91 can surely be protected with the upper part case 5R and the substrate holder 6R. Further, since the upper part case 5R has contact with the fixation part 320 and the ribs 321 through 323, the upper part case 5R can surely be disposed along the side surface part 32R. Therefore, the connection of the upper part case 5R to the side surface part 32R can easily be achieved, and in addition, the housing section HPR can be reduced in thickness compared to the case in which the upper part case 5R and the side surface part 32R are disposed separately from each other.

Due to the side surface part 32L and the case member 4L respectively having substantially the same configurations as those of the side surface part 32R and the case member 4R, substantially the same advantages as described above can be obtained.

The image projection section 91 is provided with the projection optical device 93 having the lens tube 95 for housing the lens 94 for projecting the image. Further, the frame main body 3 has the fixation part 320, which is located on the upper side of the image projection section 91, and fixes the lens tube 95. Further, the substrate holder 6R has the fixation part 61, which is located on the lower side of the image projection section 91, and is fixed to the fixation part 951 of the lens tube 95. According to this configuration, it is possible to fix the lens tube 95 to the frame main body 3, and to fix the substrate holder 6R to the lens tube 95. Therefore, the substrate holder 6R can stably be fixed to the frame main body 3.

The case member 4R is provided with the lower part case 7R, which covers the substrate holder 6R from the outside, and is connected to the upper part case 5R and the side surface part 32R, in addition to the upper part case 5R and the substrate holder 6R. According to this configuration, it is possible to house the image projection section 91 including the lens tube 95 in the housing space S surrounded by the side surface part 32R, the upper part case 5R, and the lower part case 7R. Further, since the side surface part 32R, the upper part case 5R, and the lower part case 7R are connected to each other, it is possible to prevent the dust or the like from entering the housing space S. Therefore, it is possible to prevent the image from deteriorating due to the dust attached to the lens 94 housed in the lens tube 95, and in addition, the lens tube 95 can surely be protected.

The frame main body 3 has the case fixation parts 3221, 3241, and 3251 to which the upper part case 5R, the substrate holder 6R, and the lower part case 7R are fixed. According to this configuration, it is possible to surely fix the upper part case 5R, the substrate holder 6R, and the lower part case 7R to the frame main body 3. Therefore, the upper part case 5R, the substrate holder 6R, and the lower part case 7R can stably be disposed.

The case fixation parts 3221, 3241, and 3251 are located in the ribs 322, 324, and 325, respectively. According to this configuration, there is no need to separately provide the frame main body 3 with case fixation parts for fixing the upper part case 5R, the substrate holder 6R, and the lower part case 7R to the frame main body 3. Therefore, it is possible to simplify the internal configuration of the housing section HPR, and in addition, the housing section HPR can be miniaturized.

Due to the side surface part 32L and the case member 4L respectively having substantially the same configurations as those of the side surface part 32R and the case member 4R, substantially the same advantages as described above can be obtained.

The ribs 321, 322 provided to the side surface part 32R extend along the extending direction of the side surface part 32R from the front part 31 as the support part, and the upper part case 5R has the projecting parts 511, 512 as the contacting parts having contact with the ribs 321, 322. According to this configuration, by making the projecting parts 511, 512 have contact with the ribs 321, 322, it is possible to surely dispose the upper part case 5R along the side surface part 32R. Therefore, it is possible to simplify the configuration of the upper part case 5R and, by extension, assembly of the HMD 1. Further, since the rib 323 perpendicular to the ribs 321, 322 and the projecting part 512 of the upper part case 5R have contact with each other, the upper part case 5R can be disposed along the side surface part 32R without slips. Therefore, it is possible to further simplify the configuration of the upper part case 5R and, by extension, assembly of the HMD 1.

Due to the side surface part 32L and the case member 4L respectively having substantially the same configurations as those of the side surface part 32R and the case member 4R, substantially the same advantages as described above can be obtained.

The frame main body 3 is a metallic member having the front part 31 and the side surface parts 32R, 32L integrated with each other. According to this configuration, since the frame main body 3 has the higher strength compared to the case in which the frame main body 3 is formed of resin or the like, the side surface parts 32R, 32L each having the ribs 321 through 325 can be formed to have a smaller thickness. Therefore, the housing sections HPR, HPL and, by extension, the HMD 1 can further be reduced in weight. Besides the above, since the housing sections HPR, HPL can be configured to have a smaller thickness, the wearing feeling of the HMD 1 can further be improved. Further, since the front part 31 and the side surface parts 32R, 32L are integrated with each other, no joints between these constituents are exposed. Therefore, the appearance of the HMD 1 can be made better.

Modifications of Embodiments

The invention is not limited to the embodiment described above, but includes modifications, improvements, and so on in the range where the advantages of the invention can be achieved.

In the HMD 1 described above, it is assumed that the side surface part 32R has the fixation part 320 functioning as a rib in addition to the ribs 321 through 325. However, the invention is not limited to this configuration, and the number and the extending direction of the ribs do not matter providing the side surface part 32R has a configuration of having the ribs extending along two directions crossing each other. Further, the rib extending along one direction and the rib extending along the other direction are not required to be connected to each other. Further, such ribs are assumed to be located on the inner surface 32A located on the user side in the side surface part 32R, but can also be located on the outer surface on the opposite side to the user side, or can also be located on each of the inner surface 32A and the outer surface. The same applies to the side surface part 32L.

In the HMD 1 described above, the light guide members 97R, 97L for guiding the image light, which is projected from each of the image projection sections 91 housed in the housing sections HPR, HPL, to the eyes of the user are adopted as the display sections. However, the invention is not limited to this configuration, but the display sections each can also be a display panel such as a liquid crystal panel or an organic EL panel. Therefore, it is also possible to apply the invention to a closed-type HMD. Further, a reflecting member for reflecting the image, which is projected by the image projection section 91, toward the eyes of the user can also be adopted as the display section instead of each of the light guide members 97R, 97L.

Further, the members housed in the housing sections HPR, HPL are not required to be the image projection section 91 and the control section 96, but can be only either one of these sections. Further, other members such as a control circuit or a power supply necessary for the operation of the display section can also be housed.

Further, in the HMD 1, there is adopted the configuration in which the optical devices 9R, 9L having the light guide members 97R, 97L disposed in accordance with the eyes of the user are provided in accordance with the left eye and the right eye of the user. However, the invention is not limited to this configuration, but it is also possible to configure an HMD provided with only either one of the optical devices 9R, 9L.

In the HMD 1 described above, it is assumed that the side surface parts 32R, 32L are located on the opposite side to the user side in the housing sections HPR, HPL constituted by the side surface parts 32R, 32L and the case members 4R, 4L combined with each other, respectively. In other words, it is assumed that the side surface parts 32R, 32L constitute the outer surface in the housing sections HPR, HPL, respectively. However, the invention is not limited to this configuration, but the side surface parts 32R, 32L can also be located on the user side. In this case, it is also possible to attach the case members 4R, 4L to the frame main body 3 on the opposite side to the user side, namely the outer side.

In the HMD 1 described above, it is assumed that the case member 4R to be combined with the side surface part 32R is configured including the upper part case 5R as the first case, the substrate holder 6R as the second case, and the lower part case 7R as the third case. However, the invention is not limited to this configuration, but it is also possible to adopt a configuration in which the case member includes the first case and the second case, but does not include the third case providing the members (e.g., the image projection section 91 and the control section 96) making a contribution to the image display in the light guide members 97R, 97L can be housed. The same applies to the case member 4L.

In the HMD 1 described above, it is assumed that the frame main body 3 has the fixation part 320 for screw-fixing the lens tube 95, and the substrate holder 6R has the fixation part 61 to be fixed to the lens tube 95. However, the invention is not limited to this configuration, but the lens tube 95 can be fixed to the upper part case 5R, and the substrate holder 6R is not required to be fixed to the lens tube 95. In other words, it is also possible for the lens tube 95 to be fixed to any members as long as the lens tube 95 is fixed in each of the housing sections HPR, HPL.

Further, since the projection optical device 93 having the lens tube 95 is integrated with the image forming device 92 to constitute the image projection section 91, it is also possible for the image projection section 91 to be fixed to the fixation part 320, and it is also possible for the substrate holder 6R to be fixed to the image projection section 91. Incidentally, the image forming device 92 and the projection optical device 93 are not required to be integrated with each other.

In the HMD 1 described above, the case fixation parts 3221, 3241, and 3251 for fixing the upper part case 5R, the substrate holder 6R, and the lower part case 7R are located at the ribs 322, 324, and 325, respectively. However, the invention is not limited to this configuration, but the case fixation parts for fixing these constituents can be located anywhere in the frame main body 3. It should be noted that if the case fixation parts are located in a region on the back side of the frame main body 3 including the side surface parts 32R, 32L, the case fixation parts can be configured and arranged so as not to become obstacles to the image projection by the image projection section 91 to the light guide members 97R, 97L.

In the HMD 1 described above, it is assumed that the upper part case 5R as the first case has the projecting parts 511, 512 as the contacting parts having contact with the fixation part 320 and the ribs 321 through 323 provided to the side surface part 32R. However, the invention is not limited to this configuration, but the ribs having contact with the contacting parts can be any of the fixation part 320 and the ribs 321 through 325. The same applies to the upper part case 5L and the side surface part 32L. It should be noted that if the ribs located along the extending direction of the side surface parts 32R, 32L from the front part 31 as the support part and the contacting parts have contact with each other, it is possible to make the upper part cases 5R, 5L easy to dispose along the side surface parts 32R, 32L, respectively.

Incidentally, the contacting parts to have contact with the ribs 321 through 325 provided to the side surface parts 32R, 32L can also be eliminated from the case members 4R, 4L, respectively.

In the HMD 1 described above, it is assumed that the frame main body 3 is a metallic member having the front part 31 and the side surface parts 32R, 32L integrated with each other. However, the invention is not limited to this configuration, but the frame main body 3 can be formed of resin, or the front part 31 and the side surface parts 32R, 32L can be connected to each other with fixation devices such as screws. In other words, it is not required for the frame main body 3 to be the integrally molded product made of metal.

In the HMD 1 described above, it is assumed that there is adopted the configuration in which the HMD 1 is made to be able to be mounted on the head of the user with the nose pad NP, the lens holder LH, and the temples TMR, TML. However, the invention is not limited to this configuration, but it is also possible to adopt a configuration of making it possible to mount the frame main body 3, or a support member for supporting the frame main body 3 on the head of the user with a mounting member such as a band. On this occasion, for example, it is also possible for the mounting member to extend from the back side of the housing sections HPR, HPL, or it is also possible for the frame main body 3 to be connected to the fixation member fixed to the head of the user.

In the HMD 1 described above, it is assumed that the control section 96 constituting each of the optical devices 9L, 9R controls the operation of the image projection section 91, namely the image formation by the image forming device 92. However, the invention is not limited to this configuration, but it is also possible for the control section 96 to perform the operation control (including lighting of the light emitting part) of the imaging device 8 as, for example, the control section 96 constituting the optical device 9R described above, or perform charge control of a battery held by the frame 2 using electrical power supplied from the outside, or further control communication with an image display device such as another HMD 1, or an electronic apparatus such as an image supply device. In other words, the process performed by the control section 96 housed in each of the housing sections HPR, HPL can be another process. In this case, the control device for controlling the operation of the image forming device 92 can be disposed in another place.

Further, the control section 96 is not limited to the printed board, but can also be a flexible printed board, or a control unit having a circuit element such as an arithmetic processing circuit. In other words, the configuration of the control section in the invention does not matter as long as the control section performs the predetermined control.

The entire disclosure of Japanese Patent Application No. 2016-026430, filed Feb. 15, 2016 is expressly incorporated by reference herein.

What is claimed is:

1. A head-mount type image display device comprising:
a display section adapted to display an image;
a frame member adapted to support the display section; and
a case member attached to the frame member,
wherein the frame member includes
a support part adapted to support the display section, and
a side surface part extending from an end of the support part in a direction crossing the support part,
the case member is combined with the side surface part to form a housing space adapted to house a housed member making a contribution to display of the image by the display section,
the side surface part includes
a first rib extending along a first direction, and
a second rib extending along a second direction crossing the first direction,
the housed member includes an image projection section housed in the housing space, and adapted to project the image to the display section, and
the case member includes
a first case adapted to be engaged with at least one of the first rib and the second rib to cover the image projection section from an upper side, and
a second case adapted to cover the image projection section from a lower side.

2. The head-mount type image display device according to claim 1, wherein
the first rib and the second rib cross each other.

3. The head-mount type image display device according to claim 1, wherein
the image projection section has a lens tube adapted to house a lens adapted to project the image,
the frame member has a first fixation part, which is disposed on an upper side of the lens tube, and to which the lens tube is fixed,
the second case is located on a lower side of the lens tube, and
the second case has a second fixation part to be fixed to the lens tube.

4. The head-mount type image display device according to claim 1, wherein
the case member includes a third case adapted to cover the second case from an outer side, and connected to the first case and the side surface part.

5. The head-mount type image display device according to claim 4, wherein
the frame member has a case fixation part to which the first case, the second case, and the third case are fixed.

6. The head-mount type image display device according to claim 5, wherein
the case fixation part is located in at least either of the first rib and the second rib.

7. The head-mount type image display device according to claim 1, wherein
the first direction is along an extending direction of the side surface part from the support part, and
the first case has a contact part having contact with the first rib extending along the first direction.

8. The head-mount type image display device according to claim 1, wherein
the frame member is a metallic member having the support part and the side surface part integrated with each other.

9. A head-mount type image display device comprising:
a display section adapted to display an image;
a frame member adapted to support the display section; and
a case member attached to the frame member,
wherein the frame member includes
a support part adapted to support the display section, and
a side surface part extending from an end of the support part in a direction crossing the support part, and
the side surface part has a rib, which extends from an end part of the support part to an end part of the side surface part in a direction crossing the support part, and engages with the case member to fix the case member,
the housed member includes an image projection section housed in the housing space, and adapted to project the image to the display section, and
the case member includes
a first case adapted to be engaged with the rib to cover the image projection section from an upper side, and
a second case adapted to cover the image projection section from a lower side.

* * * * *